United States Patent
Goto et al.

(10) Patent No.: US 11,255,661 B2
(45) Date of Patent: Feb. 22, 2022

(54) COLUMNAR-OBJECT-STATE DETECTION DEVICE, COLUMNAR-OBJECT-STATE DETECTION METHOD, AND COLUMNAR-OBJECT-STATE DETECTION PROCESSING PROGRAM

(71) Applicant: NIPPON TELEGRAPH AND TELEPHONE CORPORATION, Tokyo (JP)

(72) Inventors: Takashi Goto, Musashino (JP); Ryuji Honda, Musashino (JP); Yukihiro Goto, Musashino (JP); Yoshiyuki Kajihara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/977,860

(22) PCT Filed: Feb. 28, 2019

(86) PCT No.: PCT/JP2019/007792
§ 371 (c)(1),
(2) Date: Sep. 3, 2020

(87) PCT Pub. No.: WO2019/172065
PCT Pub. Date: Sep. 12, 2019

(65) Prior Publication Data
US 2021/0025696 A1    Jan. 28, 2021

(30) Foreign Application Priority Data
Mar. 5, 2018 (JP) .............................. JP2018-038969

(51) Int. Cl.
*G01B 11/24* (2006.01)

(52) U.S. Cl.
CPC .................................... *G01B 11/24* (2013.01)

(58) Field of Classification Search
CPC ......... G01B 11/24; G01C 15/00; G01S 17/89; G01S 7/4802; G01S 7/4808; G06F 21/35;
(Continued)

(56) References Cited

FOREIGN PATENT DOCUMENTS

| JP | 201578849 A | 4/2015 |
|---|---|---|
| JP | 2015224980 A | 12/2015 |

OTHER PUBLICATIONS

Mitsubishi Electric, "Mitsubishi Mobil Mapping System High-precision GPS Movement Measuring Device". Jan. 11, 2018 (Reading Day), <http://www.mitsubishielectric.co.jp/mms/>.
(Continued)

*Primary Examiner* — Tri T Ton
(74) *Attorney, Agent, or Firm* — Harness, Dickey & Pierce, P.L.C.

(57) ABSTRACT

A columnar object state detection device according to an embodiment is a device for detecting a state of a columnar object including: an acquisition unit configured to acquire central axis data that is an array of coordinate values of center points of the columnar object in a horizontal direction at a plurality of predetermined heights of the columnar object; an approximation equation calculating unit configured to calculate a correction approximation equation for correcting the coordinate values of the central axis data acquired by the acquisition unit through curve fitting for the array of coordinate values of the central axis data acquired by the acquisition unit; and correction unit configured to correct the coordinate values of the acquired central axis data using the correction approximation equation calculated by the approximation equation calculating unit.

9 Claims, 14 Drawing Sheets

(58) Field of Classification Search
CPC ......... G06F 21/36; G06F 21/40; G06Q 10/10; H04L 63/083; H04W 12/068; H04W 12/069
USPC .................................................. 356/614–640
See application file for complete search history.

(56) References Cited

OTHER PUBLICATIONS

AISAN Technology Co. Ltd. BAUMstation, Jan. 22, 2018 (Reading Day). <http://www.aisantec.co.jp/products-services/atstation/baumstation.html>.

| NUMBER | QUADRATIC POLYNOMIAL | CUBIC POLYNOMIAL | SPLINE FUNCTION |
|---|---|---|---|
| 1 | 0.6 | 2.7 | 0.9 |
| 2 | 1.3 | 2.3 | 2.0 |
| 3 | 1.7 | 3.6 | 2.6 |
| 4 | 1.3 | 3.1 | 2.2 |

COLUMNAR-OBJECT-STATE DETECTION DEVICE, COLUMNAR-OBJECT-STATE DETECTION METHOD, AND COLUMNAR-OBJECT-STATE DETECTION PROCESSING PROGRAM

CROSS-REFERENCE TO RELATED APPLICATIONS

This application is a 371 U.S. National Phase of International Application No. PCT/JP2019/007792, filed on Feb. 28, 2019, which claims priority to Japanese Application No. 2018-038969, filed on Mar. 5, 2018. The entire disclosures of the above applications are incorporated herein by reference.

TECHNICAL FIELD

The present invention relates to a columnar object state detection device, a columnar object state detection method, and a columnar object state detection processing program for detecting a state of a columnar object that is installed outdoors and becomes a target to be managed.

BACKGROUND ART

Conventionally, in order to measure states, for example, shapes of columnar objects, for example, poles (utility poles and the like), trees, or the like that are management targets installed outdoors, various scanning devices are used. For example, there are techniques such as (1) acquiring an image using a camera and performing the measurement described above using distances in the acquired image, (2) directly measuring a plurality of points on the surfaces of objects using a surveying instrument, (3) generating stereoscopic data from point cloud data received using a laser scanner and performing the measurement described above, and the like. However, in any one of such techniques, a scanning device needs to be disposed at a short distance from a target object, and an operator needs to operate this device. In addition, in order to acquire point cloud data using a 3D scanner and a laser scanner, there are problems of taking a scanning time of, for example, several minutes to several tens of minutes and the like.

Meanwhile a mobile mapping system (MMS), in which a three-dimensional laser scanner (a 3D laser surveying instrument), a camera, a global positioning system (GPS) receiver, an inertial measurement unit (IMU), and an odometer are mounted in an inspection vehicle, acquiring three-dimensional shapes of outdoor structures by comprehensively performing three-dimensional surveying of outdoor structures including buildings, roads, bridges, and the like in the vicinity and collecting three-dimensional (XYZ) coordinates of multiple points on the surfaces of the outdoor structures while the inspection vehicle travels on the road is known (for example, see Non-Patent Literature 1). This system acquires absolute three-dimensional coordinates of an irradiation place irradiated using a laser beam emitted to the surface of an outdoor structure as three-dimensional point cloud data in a range of a measurement error of the MMS and a measurement error of the GPS receiver. In accordance with this, a scanning time required for acquiring point cloud data can be shortened.

In addition, a method of generating stereoscopic data of objects using point cloud data acquired using this MMS and detecting states of facilities using this generated stereoscopic data is known (for example, see PLT 1). By using this method, stereoscopic data of an object is generated, and data relating to a shape of the object, for example, a shape of a utility pole such as an inclination of a central axis, a deflection, and the like can be automatically generated.

CITATION LIST

Patent Literature

Patent Literature 1: Japanese Unexamined Patent Application Publication No. 2015-078849
Patent Literature 2: Japanese Unexamined Patent Application Publication No. 2015-224980

Non Patent Literature

Non-Patent Literature 1: "Mitsubishi Mobile Mapping System High Precision GPS Movement Measuring Device", [online], Mitsubishi Electric Corporation [found on Jan. 11, 2018], Internet <URL: http://www.mitsubishielectric.co.jp/mms/>
Non-Patent Literature 2: "Baum Station", [online], Aisan Technology Co., Ltd. [found on Jan. 22, 2018], Internet <URL:http://www.aisantec.co.jp/products-services/atstation/baumstation.html>

SUMMARY OF THE INVENTION

Technical Problem

However, because the MMS performs scanning by causing an inspection vehicle to travel, the accuracy of three-dimensional coordinates information of point cloud data may deteriorate because of a sudden change of the posture of the vehicle due to a curve, a road state, and the like. Stereoscopic data using point cloud data of which the accuracy has deteriorated in this way includes error also in the shape of an object represented by this data.

The deterioration of the accuracy described above occurs in accordance with a combination of various factors such as satellite visibility states and the like in addition to curves and the state of the road surface described above, and thus, it cannot be correctly determined whether the accuracy of the acquired point cloud data and the generated stereoscopic data is high or low.

In addition, as for an outdoor ground object, for example, a utility pole blocked by a tree and the like causes deficiency in point cloud data and image data, and stereoscopic data for corresponding parts cannot be generated, whereby the shape of the object cannot be perceived.

In addition, there is also a technique for correcting point cloud data using correction data acquired by other surveying and the like. However, in order to use this technique, operations such as measurement with a device installed at a measurement site and the like are necessary for acquiring correction data, and thus shortening of a scanning time, which is the original object, cannot be achieved.

An operator can perceive a deviation of position coordinates using both the acquired point cloud data and image data without performing surveying at a site. However, also in this case, the image data does not have three-dimensional coordinates information with an accuracy that is as high as that of the point cloud data, and accordingly, skills of the operator are required for correcting a deviation of position coordinates.

As disclosed in Patent Literature 2 described above, there is also a technology for estimating a shape of stereoscopic data on the basis of acquired point group information. However, in this technology, because point cloud data is required for estimating and correcting the shape of the stereoscopic data, a shape of an object measured without using point cloud data, for example, a shape acquired using a dedicated device as illustrated in Non-Patent Literature 2 described above cannot be used for the correction. In addition, because the amount of the point cloud data is huge, the storage volume of such data becomes large, and a calculation time required for estimating and correcting stereoscopic data increases as well.

The present invention is realized with the situations described above taken into account, and an object thereof is to provide a columnar object state detection device, a columnar object state detection method, and a columnar object state detection processing program capable of easily acquiring a state of a columnar object with high accuracy without using new point cloud data or image data.

Means for Solving the Problem

In order to achieve the object described above, a first aspect of a columnar object state detection device according to an embodiment of the present invention is a device for detecting a state of a columnar object and includes an acquisition unit configured to acquire central axis data that is an array of coordinate values of center points of the columnar object in a horizontal direction at a plurality of predetermined heights of the columnar object. The first aspect further includes an approximation equation calculating unit configured to calculate a correction approximation equation for correcting the coordinate values of the central axis data acquired by the acquisition unit through curve fitting for the array of the coordinate values of the central axis data acquired by the acquisition unit. The first aspect further includes a correction unit configured to correct the coordinate values of the central axis data acquired by the acquisition unit using the correction approximation equation calculated by the approximation equation calculating unit.

A second aspect of the columnar object state detection device of the present invention, in the first aspect described above, further includes an extraction unit configured to extract three-dimensional model data acquired by three-dimensionally modeling the columnar object from three-dimensional point cloud data representing three-dimensional coordinates of points on a surface of the columnar object. In the second aspect, the acquisition unit acquires the central axis data that is the array of the coordinate values of the center points of the columnar object in the horizontal direction at the plurality of predetermined heights of the columnar object on the basis of the three-dimensional model data extracted by the extraction unit.

According to a third aspect of the columnar object state detection device of the present invention, in the first aspect, the approximation equation calculating unit selects an appropriate type of the correction approximation equation on the basis of a difference between the array of the coordinate values of the central axis data acquired by the acquisition unit and a result of the curve fitting based on each of functions of a plurality of types for the array and calculates the correction approximation equation through the curve fitting according to the selected type.

According to a fourth aspect of the columnar object state detection device of the present invention, in the first aspect, the approximation equation calculating unit selects an appropriate type of the correction approximation equation on the basis of a parameter representing a measurement state of the three-dimensional point cloud data and calculates the correction approximation equation through the curve fitting according to the selected type.

According to a fifth aspect of the columnar object state detection device of the present invention, in the first aspect, the coordinate values of the central axis data acquired by the acquisition unit are coordinate values in which coordinate values of a center point at a predetermined height of the columnar object are missing. In the fifth aspect, a complementation unit configured to complement the missing coordinate values among the coordinate values of the central axis data corrected by the correction unit on the basis of the correction approximation equation calculated by the approximation equation calculating unit is further included.

A sixth aspect of the columnar object state detection device of the present invention, in the first aspect, further includes an accuracy calculating unit configured to calculate an accuracy of correction of the central axis data according to the correction unit on the basis of differences between the coordinate values of the central axis data acquired by the acquisition unit and coordinate values after correction of the coordinate values according to the correction unit.

A seventh aspect of the columnar object state detection device of the present invention, in the first aspect, further includes a calculation unit. The calculation unit described above sets a vertical axis and a reference axis that is a straight line passing near a center point at a height up to a predetermined first height of the columnar object for three-dimensional model data of the columnar object. The calculation unit described above calculates an angle between the vertical axis and the reference axis as an inclination of the central axis of the columnar object. The calculation unit described above calculates a distance between coordinates of a center point corresponding to a predetermined second height of the columnar object represented by the central axis data corrected by the correction unit and a position at the second height on the reference axis as a deflection of the central axis of the three-dimensional model data of the columnar object.

One aspect of a columnar object state detection method performed by a columnar object state detection device according to an embodiment of the present invention acquires central axis data that is an array of coordinate values of center points of the columnar object in a horizontal direction at a plurality of predetermined heights of the columnar object, calculates a correction approximation equation for correcting the coordinate values of the acquired central axis data through curve fitting for the array of the coordinate values of the acquired central axis data, and corrects the coordinate values of the acquired central axis data using the calculated correction approximation equation.

One aspect of a columnar object state detection processing program according to an embodiment of the present invention causes a processor to function as each of the unit of the columnar object state detection device according to the first aspect.

Effects of the Invention

According to the first and second aspects of the columnar object state detection device according to one embodiment of the present invention, coordinate values of central axis data can be corrected without using new point cloud data or image data.

According to the third and fourth aspects of the columnar object state detection device described above, an appropriate type of a correction approximation equation can be selected.

According to the fifth aspect of the columnar object state detection device described above, missing coordinate values of the central axis data can be complemented.

According to the sixth aspect of the columnar object state detection device described above, the accuracy of correction of the central axis data can be calculated.

According to the seventh aspect of the columnar object state detection device described above, the inclination and the deflection of the central axis can be acquired without using new point cloud data or image data.

In other words, according to the present invention, a state of a columnar object can be easily acquired with high accuracy without using new point cloud data or image data for correcting data representing the state of the columnar object that is installed outdoors and is a management target.

DESCRIPTION OF EMBODIMENTS

Hereinafter, an embodiment of the present invention will be described with reference to the drawings.

Figure 1:
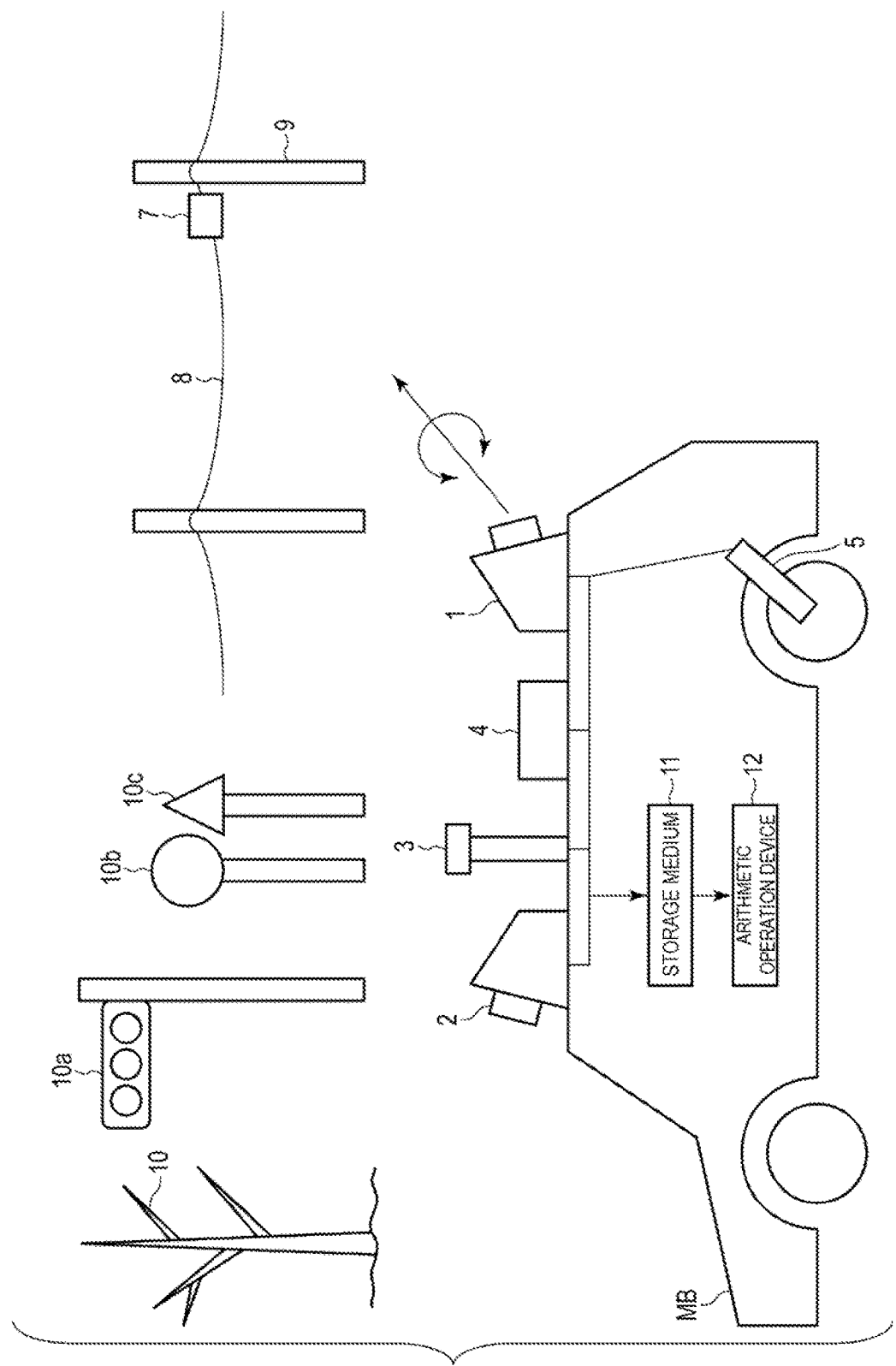
FIG. 1 is a schematic configuration diagram as one example of a columnar object state detection device according to an embodiment of the present invention.

FIG. 1 is a schematic configuration diagram as one example of a columnar object state detection device according to an embodiment of the present invention.

The columnar object state detection device is mounted in an inspection vehicle MB and includes a three-dimensional laser scanner 1 as a 3D laser surveying instrument, a camera 2, a GPS receiver 3, an IMU 4 as an inertial measurement unit, an odometer 5 as a traveling distance meter, a storage medium 11, and an arithmetic operation device 12. The columnar object state detection device acquires original measurement data (measurement data before correction) used for generating central axis data of a columnar model acquired by modeling columnar objects.

The storage medium 11 may be realized using a storage device such as a nonvolatile memory or the like. A plurality of three-dimensional laser scanners 1, cameras 2, and GPS receivers 3 may be mounted.

The detection device performs three-dimensional surveying for the surrounding area using the three-dimensional laser scanner 1, the camera 2, the GPS receiver 3, the IMU 4, and the odometer 5 during the traveling of the inspection vehicle MB and stores point cloud data representing results of such surveying in a storage medium 11 as a storage device. As a result, the detection device acquires three-dimensional point cloud data (hereinafter, it may be referred to as point cloud data) representing three-dimensional coordinates of points on the surfaces of columnar objects including a closure 7, a cable 8, a pole 9, a tree 10, a traffic lamp 10a, traffic signs 10b and 10c, and the like as image data of the external appearance of these columnar objects.

In other words, the three-dimensional laser scanner 1, the camera 2, the GPS receiver 3, the IMU 4, and the odometer 5 are measuring units that measure three-dimensional point cloud data. A cable 8 passes through a plurality of poles 9, and the closure 7 may be mounted in the cable 8 between the poles 9.

Figure 2:
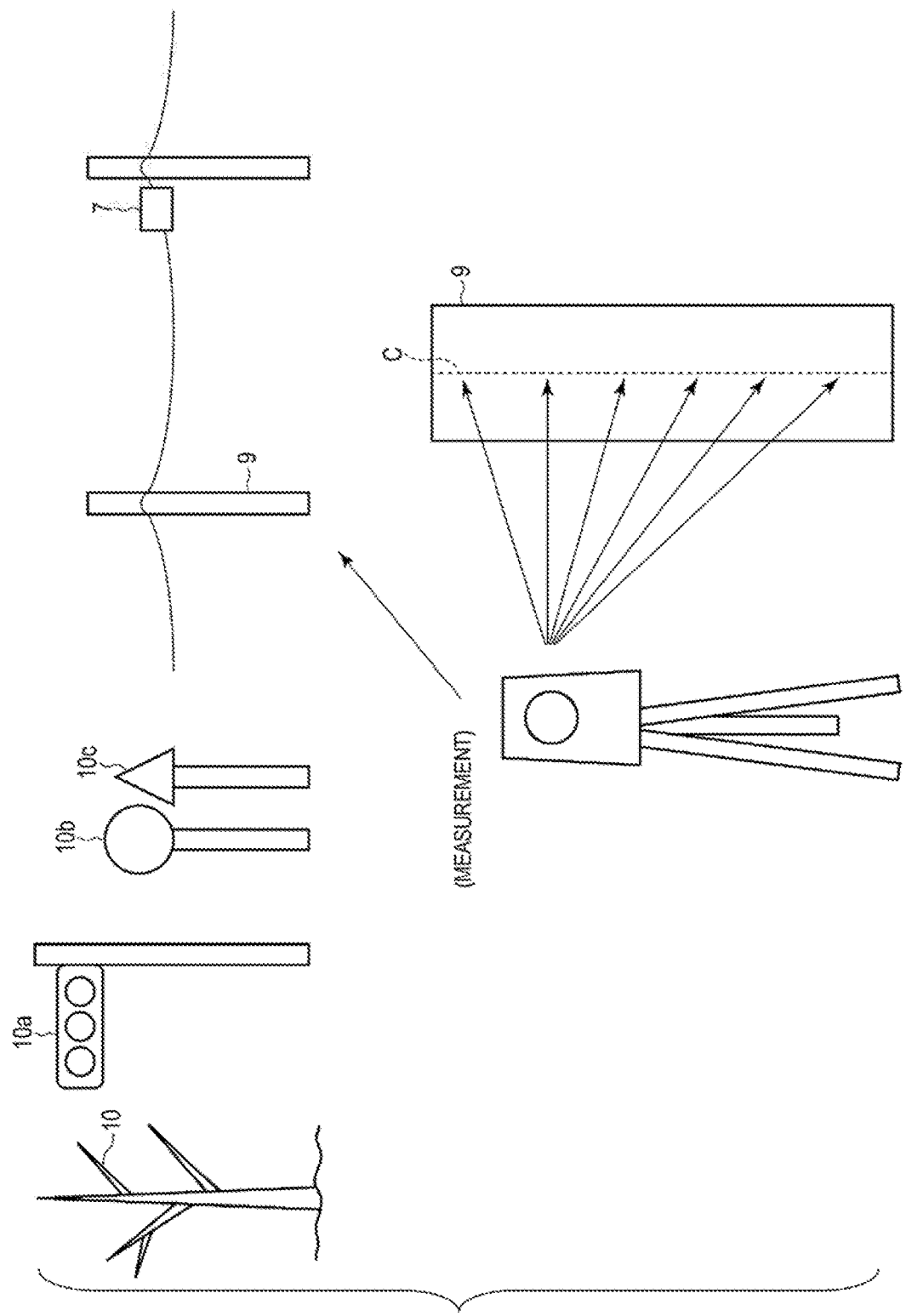
FIG. 2 is a diagram illustrating measurement of a columnar object using a surveying instrument.

FIG. 2 is a diagram illustrating measurement of a columnar object using a surveying instrument.

A form of measurement to which an embodiment of the present invention can be applied is not limited to the form in which the inspection vehicle MB illustrated in FIG. 1 is used, and an embodiment of the present invention can be applied also to a form in which coordinates of several points forming a central axis C of a columnar object are measured by the surveying instrument (for example, see Non-Patent Literature 2) illustrated in FIG. 2, and results of the measurement are stored in the storage medium 11.

Figure 3:
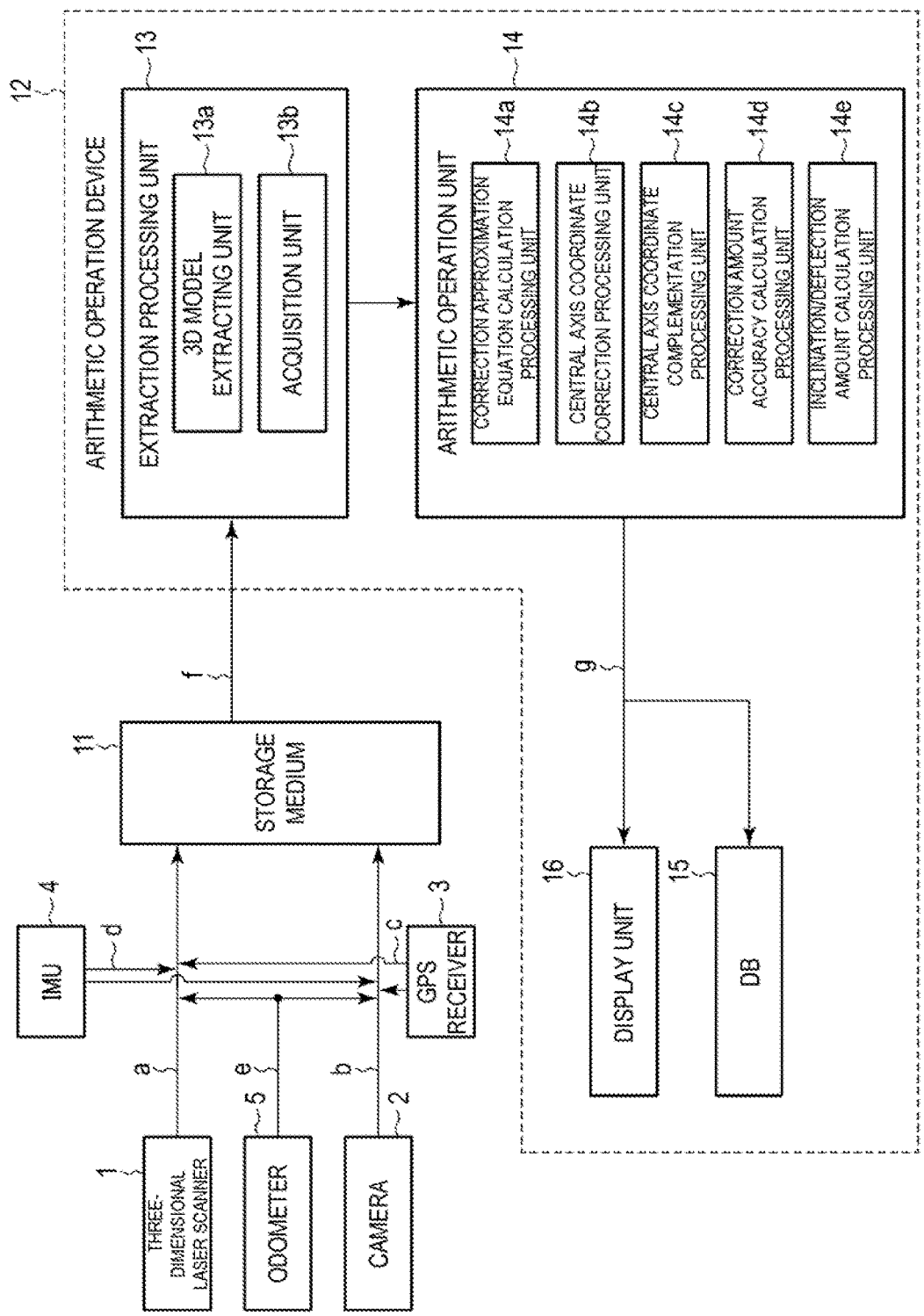
FIG. 3 is a block diagram illustrating one example of the detailed configuration of a columnar object state detection device according to an embodiment of the present invention.

FIG. 3 is a block diagram illustrating one example of the detailed configuration of a columnar object state detection device according to an embodiment of the present invention. The GPS receiver 3 receives GPS signals transmitted from a plurality of GPS satellites not illustrated in the drawing and calculates position coordinates (the latitude, the longitude, and the altitude) of the inspection vehicle MB (a in FIG. 3).

The three-dimensional laser scanner 1 acquires position coordinates data of a plurality of points on the surfaces of columnar objects such as the closure 7, the cable 8, the pole 9, the tree 10, the traffic lamp 10a, the traffic signs 10b and 10c, and the like in accordance with the position coordinates calculated by the GPS receiver 3. The position coordinates data corresponds to the three-dimensional (X, Y, Z) position coordinates data in which the position coordinates detected by the GPS receiver 3 are reflected. The three-dimensional position coordinates data acquired as above is stored in the storage medium 11 in association with information representing a measurement time.

The camera 2 images an area including the columnar objects. Image data (b in FIG. 3) acquired through this imaging is stored in the storage medium 11 in association with the imaging time and the position coordinates (c in FIG. 3) detected by the GPS receiver 3.
In addition, acceleration data (d in FIG. 3) of the inspection vehicle MB output from the IMU 4 described above and traveling distance data (e in FIG. 3) of the inspection vehicle MB output from the odometer 5 are stored in the storage medium 11 in association with the measurement time, the image data imaged by the camera 2, and the position coordinates described above. The configuration described above can be realized by the MMS described in Background Art.

The arithmetic operation device 12 can be configured as a computer including a central processing unit (CPU), a program memory, an arithmetic operation memory, and the like. As functions required for performing this embodiment, the arithmetic operation device 12 includes an extraction processing unit 13, an arithmetic operation unit 14, a DB 15 that is a database, and a display unit 16.
The extraction processing unit 13 and the arithmetic operation unit 14 can be realized by a CPU executing a program stored in a program memory. The DB 15 can be realized by a storage device such as a nonvolatile memory or the like. The display unit 16 can be realized by a liquid crystal display or the like.
Although the arithmetic operation device 12 can be configured by hardware, a program having a sequence illustrated in a flowchart to be described below may be installed in a known computer through a medium or a communication line, and the arithmetic operation device 12 can be realized also by a combination of this computer and the DB 15, a computer including the DB 15, or the like.

The DB 15 may be disposed in the storage medium 11 instead of being disposed inside the arithmetic operation device 12 or may be disposed in a cloud server other than the detection device, a local server, or the like. In such a case, the detection device acquires data stored in this DB 15 from the DB 15 of the cloud server or the local server through a communication network using a communication unit.

The extraction processing unit 13 includes a 3D model extracting unit 13a and an acquisition unit 13b.
The 3D model extracting unit 13a creates 3D columnar model data acquired by performing 3D modeling of columnar objects from the point cloud data (f in FIG. 3) stored in the storage medium 11. This 3D columnar model data includes a three-dimensional object that represents a three-dimensional shape of a columnar object and three-dimensional coordinates information of the three-dimensional object.
The acquisition unit 13b acquires central axis data, which is an array of coordinate values of a center point for each of predetermined heights of a columnar object from the 3D columnar model data created by the 3D model extracting unit 13a. When the columnar object is a cylindrical object, the acquisition unit 13b may acquire an array of radii for every predetermined height of the cylindrical object from the 3D columnar model data.

The arithmetic operation unit 14 includes a correction approximation equation calculation processing unit 14a, a central axis coordinates correction processing unit 14b, a central axis coordinates complementation processing unit 14c, a correction amount accuracy calculation processing unit 14d, and an inclination/deflection amount calculation processing unit 14e.
The correction approximation equation calculation processing unit 14a calculates a correction approximation equation (hereinafter, it may be referred to as an approximation equation) that is used for correcting the central axis data. The central axis coordinate correction processing unit 14b corrects coordinates of the central axis data using the calculated approximation equation.
In a case in which coordinate values of the central axis data are an array of coordinate values of a center point for each of predetermined heights of a columnar object, and coordinates of a center point for a certain height is missing, the central axis coordinates complementation processing unit 14c complements the coordinates of the center point by acquiring coordinate values of the central axis data that is missing through analogical inference from the calculated approximation equation.
For example, this omission may be caused by influences of the presence of a blocking object for a columnar object when seen from the inspection vehicle MB and the like. The correction amount accuracy calculation processing unit 14d calculates an amount of correction (accuracy data) by comparing central axis coordinates after correction according to the calculated approximation equation with the original central axis coordinates. The corrected data, the complemented data, and the accuracy data (g in FIG. 3) can be stored in the DB 15 and can be displayed by the display unit 16.
In the creation of 3D columnar model data from the point cloud data and the acquisition of data of the central axis using the extraction processing unit 13, for example, known techniques disclosed in Japanese Unexamined Patent Application Publication No. 2017-156179 and the like can be used.

Figure 4:
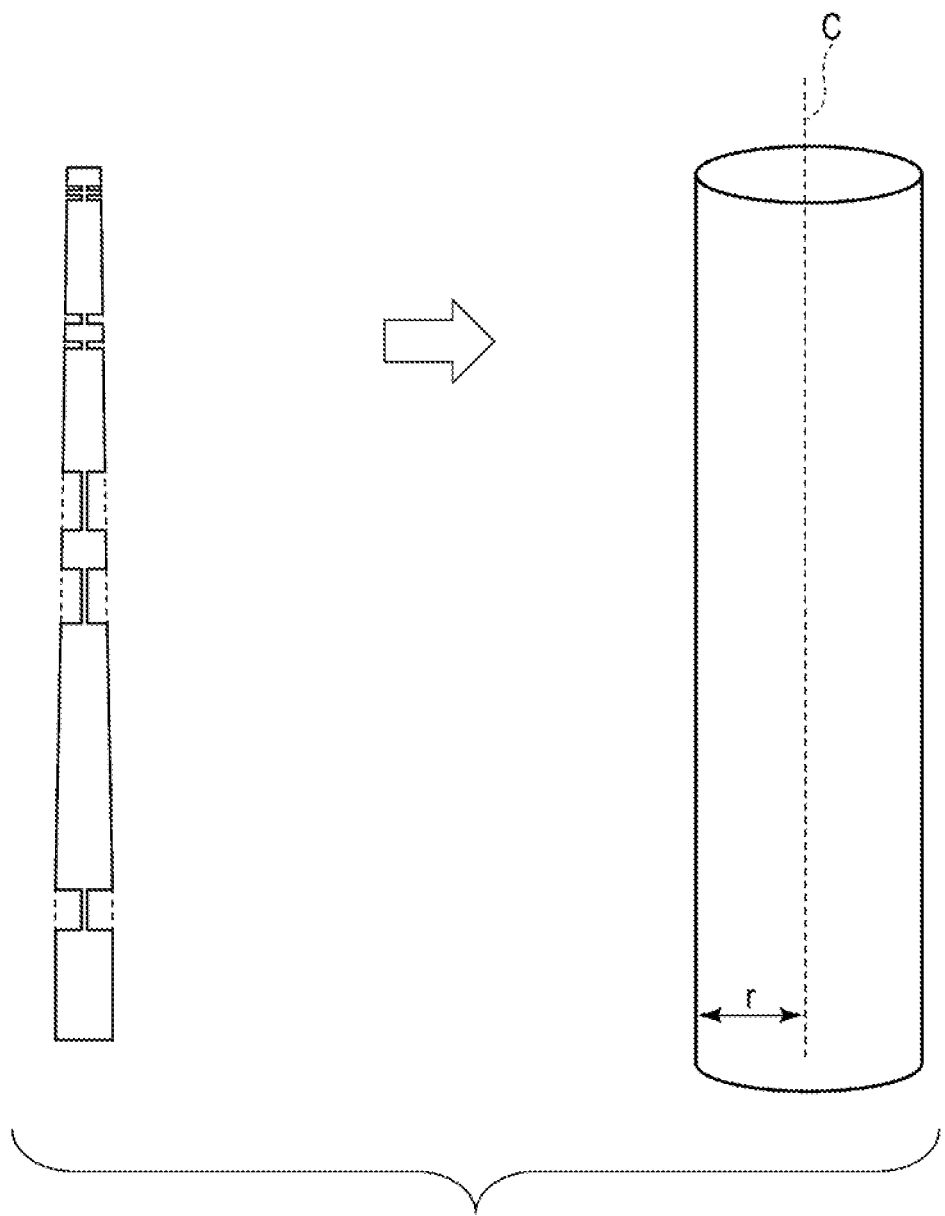
FIG. 4 is a diagram illustrating acquisition of central axis data from a 3D columnar model.

FIG. 4 is a diagram illustrating acquisition of central axis data from a 3D columnar model.
The acquisition unit 13b acquires central axis data as an array of central axis coordinates illustrated in FIG. 4. The central axis data is data defining a central axis (C in FIG. 4) having a radius r as an array of coordinate values (x, y, z) of a center point for each of predetermined heights of the columnar model for a 3D columnar model.
For example, in a case in which the three-dimensional coordinates (x, y, z) of a center point of the bottom face of the columnar model are acquired as coordinates (x=10 mm, y=20 mm, z=30 mm), and central axis data is created with each height (z) having an increment of 40 mm by the correction approximation equation calculation processing unit 14a, for example, the three-dimensional coordinates (x, y, z) of the center point of each height (z) become {(10, 20, 30), (10.1, 20.5, 70), (10.5, 22, 110), . . . }.
The coordinates of this central axis data can be defined as absolute coordinates or relative coordinates with respect to the center point of the bottom face of the columnar object.

For this reason, in a case in which central axis coordinates are defined as absolute coordinates, the correction approximation equation calculation processing unit 14a can generate central axis data of relative coordinate values by replacing these central axis coordinates with relative values from the coordinates of the center point of each height of the columnar object to the coordinates of the center point of the bottom face.

For example, when the absolute coordinates are {(10, 20, 30), (10.1, 20.5, 70), (10.5, 22, 110), . . . } as in the example described above, the correction approximation equation calculation processing unit 14a acquires differences between the coordinates of the center point of each height and the coordinate values (10, 20, 30) of the center point of the bottom face and creates an array of the central axis coordinates as relative coordinates as below.

{(0, 0, 0), (0.1, 0.5, 40), (0.5, 2.0, 80), . . . }

For example, when 3D columnar model data represents a utility pole having a height of 10 m, the columnar model central axis data of this utility pole can be defined as an array of 250 center point coordinates.

Figure 5:
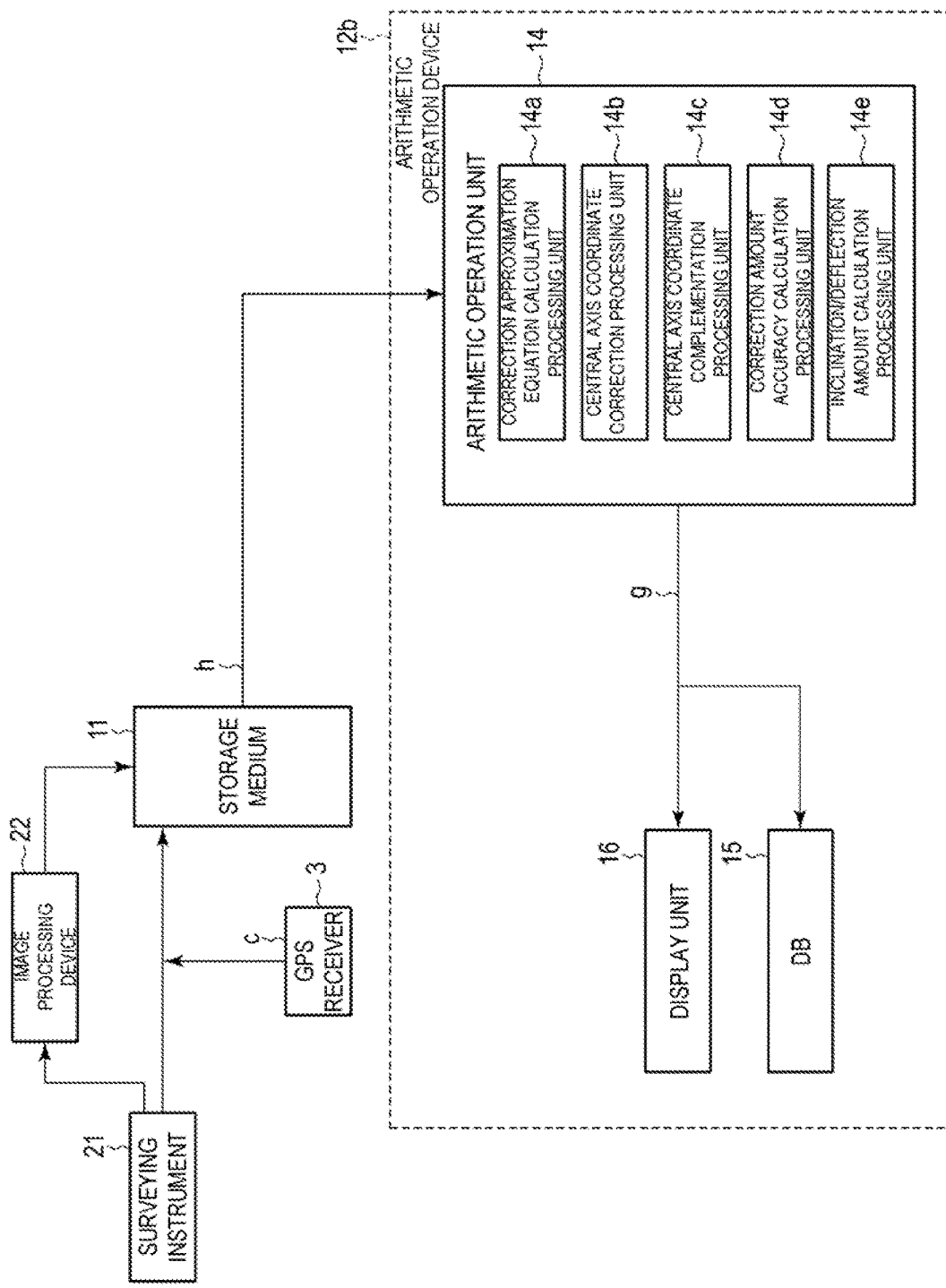
FIG. 5 is a block diagram illustrating the detailed configuration of a columnar object state detection device according to an embodiment of the present invention.

FIG. 5 is a block diagram illustrating the detailed configuration of a columnar object state detection device according to an embodiment of the present invention. When compared to the example illustrated in FIG. 3, in the example illustrated in FIG. 5, a surveying instrument 21 and an image processing device 22 are provided instead of the three-dimensional laser scanner 1, the camera 2, the IMU 4, and the odometer 5. In addition, in the example illustrated in FIG. 5, an arithmetic operation device 12b is provided instead of the arithmetic operation device 12 illustrated in FIG. 3. When compared to the arithmetic operation device 12, the arithmetic operation device 12b does not include the extraction processing unit 13. The other components of the arithmetic operation device 12b are similar to those illustrated in FIG. 3.

The surveying instrument 21 can directly measure the coordinates of a center point of a columnar object, which is a utility pole or the like, in the horizontal direction. The surveying instrument includes a device that uses a laser beam or a device that acquires other image data and performs measurement. In a case in which an image is used, the image processing device 22 acquires an external appearance of a columnar object as image data on the basis of a result of the measurement performed by the surveying instrument 21.

In the example illustrated in FIG. 5, the extraction processing unit 13 illustrated in FIG. 3 is not required, and the image processing device 22 directly generates central axis coordinates data (h in FIG. 5). The other processes are similar to those of the example illustrated in FIG. 3.

However, because it takes time to measure center points, generally, the surveying instrument creates center point data as an array of several to several tens of center point coordinates when the measurement target is a utility pole having a height of 10 m. By performing a central axis coordinate complementing processing to be described below, this embodiment can be applied also to central axis data having center point coordinates of such a small number.

Figure 6:
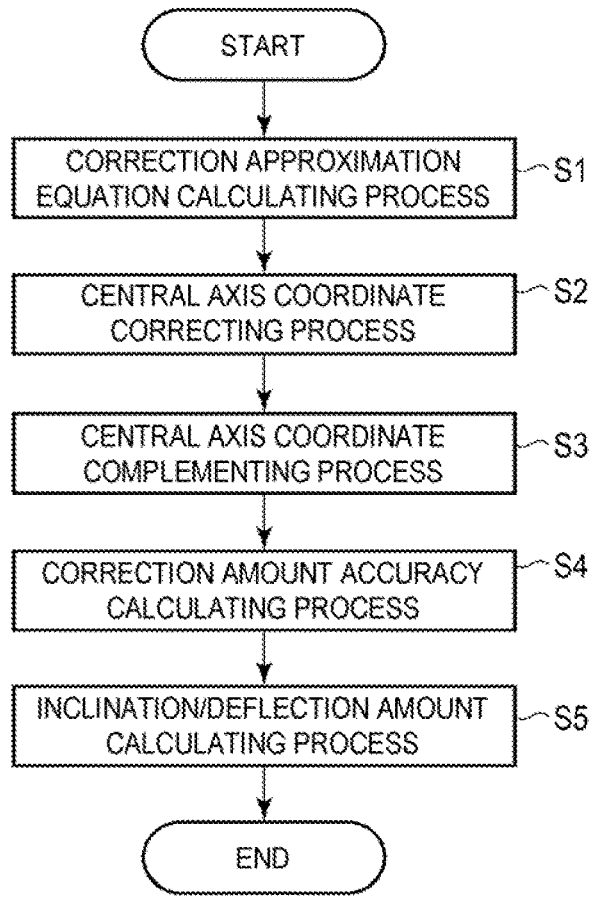
FIG. 6 is a flowchart illustrating one example of a sequence and processing details of detection of a columnar object state.

FIG. 6 is a flowchart illustrating one example of a sequence and processing details of detection of a columnar object state.

As illustrated in FIG. 6, the correction approximation equation calculation processing unit 14a of the arithmetic operation unit 14 performs a correction approximation equation calculation processing of calculating a correction approximation equation of a central axis on the basis of the central axis data (S1).

The central axis coordinate correction processing unit 14b performs processing of correcting central axis coordinates on the basis of this correction approximation equation (S2). In addition, the central axis coordinates complementation processing unit 14c performs a central axis coordinates complementing processing using the correction approximation equation calculated in S1 (S3).

The correction amount accuracy calculation processing unit 14d performs a correction amount accuracy calculation processing using the correction approximation equation calculated at S1 (S4). Finally, the inclination/deflection amount calculation processing unit 14e performs an inclination/deflection amount calculation processing for a columnar model (S5).

In addition, the correction amount accuracy calculation processing can be performed independently from the inclination/deflection amount calculation processing. In other words, the inclination/deflection amount calculation processing can be executed without performing the correction amount accuracy calculation processing. Details of the processes of the S1 to S5 will be described below.

Figure 7:
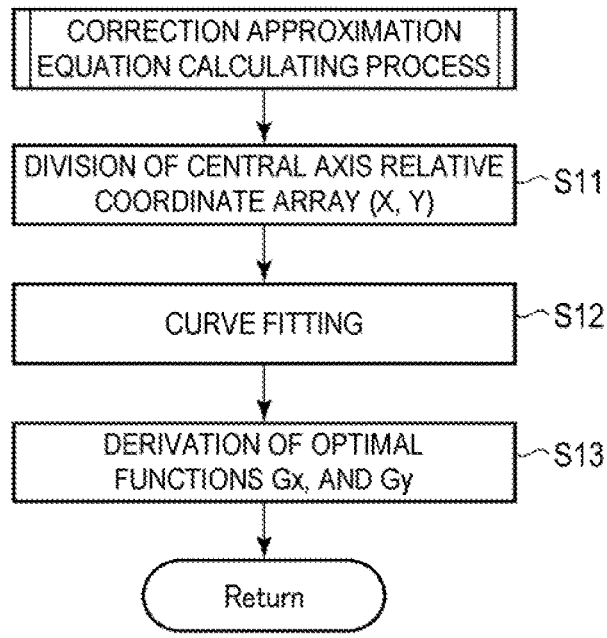
FIG. 7 is a flowchart illustrating one example of a sequence and processing details of a correction approximation equation calculation processing.
Figure 8:
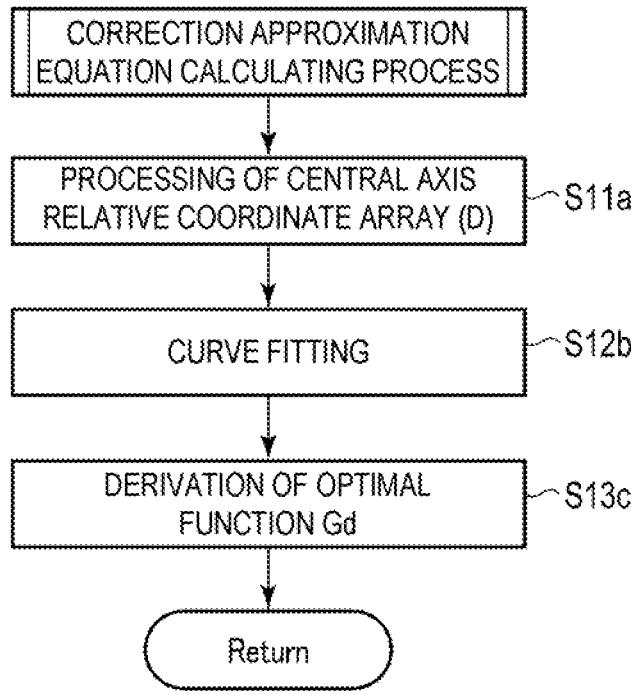
FIG. 8 is a diagram illustrating one example of a sequence and processing details of a correction approximation equation calculation processing.

FIG. 7 and FIG. 8 are flowcharts illustrating examples of a sequence and processing details of a correction approximation equation calculation processing.

The central axis data of the relative coordinates is an array of center point coordinates formed from three-dimensional coordinates (x, y, z) (hereinafter, referred to as an array O). For this reason, the correction approximation equation calculation processing unit 14a, first, divides the array into an array X of coordinates (z, x) and an array Y of coordinates (z, y) (S11).

For example, when a specific example of the array of absolute coordinates (x, y, z) from the bottom face of the columnar model is (Ser. No. 17/972,489, −69308685, 8735), (171972490, −69308684, 8775), (171972490, −69308682, 8815), (171972491, −69308681, 8855), . . . , a specific example of the array O of relative coordinates (x, y, z) from the bottom face corresponding to the absolute coordinates is (0, 0, 0), (1, 1, 40), (1, 3, 80), (2, 4, 120), . . . .

A specific example of the array X of the coordinates (z, x) when this array O is divided into an array X and an array Y is (0, 0), (40, 1), (80, 1), (120, 2), . . . . In addition, a specific example of the array Y of the coordinates (z, y) is (0, 0), (40, 1), (80, 3), (120, 4), . . . .

Next, regarding the array X, the correction approximation equation calculation processing unit 14a performs curve fitting for finding a curve (function) that best fits each coordinate value of the array X with z of coordinates (z, x) being regarded as a horizontal axis and x being regarded as a vertical axis.

In the curve fitting, for example, an optimal polynomial function $(x = az^3 + bz^2 + cz + d)$ to be applied to coordinate values of an array is estimated through a least-squares method.

The technique for acquiring a curve used here is not limited to the polynomial function of the least-square method described above, and any technique for defining a curve that appropriately fits the array X may be used.

Similarly, the correction approximation equation calculation processing unit 14a performs curve fitting for finding a curve that best fits each coordinate value of the array Y with z of coordinates (z, y) of the array Y being regarded as a horizontal axis and y being regarded as a vertical axis (S12).

Then, the correction approximation equation calculation processing unit 14a respectively derives an optimal function Gx as a correction approximation equation correcting the x coordinate of the array X and an optimal function Gy as a correction approximation equation correcting the y coordinate of the array Y on the basis of a result acquired in S12 (S13).

Specific examples of the optimal functions Gx and Gy, for example, are respectively represented in the forms of the following Equations (1) and (2).

$$Gx: X = -0.061z^3 + 2.507z^2 + 12.660z + 0.137 \quad \text{Equation (1)}$$

$$Gy: Y = -0.059z^3 + 1.460z^2 + 23.809z - 0.950 \quad \text{Equation (2)}$$

Generally, while the height of the utility pole is ten and several meters, a displacement of the central axis in the columnar model of the utility pole is about ten and several centimeters. For this reason, the value of z in the above-described specific example of the optimal functions Gx and Gy is set to 1/1000 of an actual value (40 or the like) of the array.

Here, another example of the processing according to the correction approximation equation calculation processing unit 14a will be described.

In the example illustrated in FIG. 8, the correction approximation equation calculation processing unit 14a creates data integrated into an array D of two-dimensional coordinates (z, d) in which the array O of the three-dimensional coordinates described above is represented as (z, sqrt($x^2+y^2$)) for the central axis data (x, y, z) of relative coordinates as data of an array of displacement amounts from the center point of the bottom face (S11a).

A specific example of the array D of the coordinates (z, d), which is an integration destination of the array O described above is (0, 0), (40, sqrt (2)), (80, sqrt (10)), (120, sqrt (20)), . . . .

The correction approximation equation calculation processing unit 14a performs curve fitting for acquiring a curve that best fits each coordinate value of the array D with z of coordinates (z, d) of the array D being regarded as a horizontal axis and d being regarded as a vertical axis (S12a).

The correction approximation equation calculation processing unit 14a derives, on the basis of the acquired curves, an optimal function Gd that is a correction approximation equation of the d coordinate of the array D, in other words, a displacement amount (S13a).

In this embodiment, the correction approximation equation calculation processing unit 14a performs the curve fitting for the entire length of each array. However, the range of the curve fitting in the height direction (z) can be changed by the correction approximation equation calculation processing unit 14a that, for example, performs curve fitting using an array having only a height below 5 m that is required for the calculation of a deflection and the like.

Figure 9:
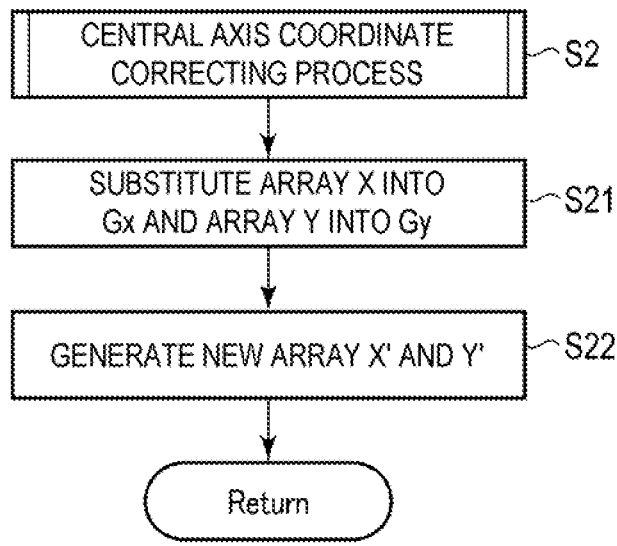
FIG. 9 is a flowchart illustrating one example of a sequence and processing details of a central axis coordinate correction processing.

FIG. 9 is a flowchart illustrating one example of a sequence and processing details of a central axis coordinate correction processing.

The central axis coordinates correction processing unit 14b substitutes z values of the original array O (an array X, an array Y) into heights (z) of optimal functions Gx and Gy acquired by the correction approximation equation calculation processing unit 14a (S21). As a result, the central axis coordinate correction processing unit 14b can acquire coordinates after correction of an x coordinate of the array X and a y coordinate of the array Y (S22).

In a case in which the x coordinate and the y coordinate after correction are respectively defined as an x' coordinate of an array X' and a y' coordinate of an array Y', for example, the array O described above is converted into an array O' after correction. For example, center point coordinates having coordinates (x, y, z) before correction are converted into center point coordinates having coordinates after correction (x', y', z) (=(Gx(z), Gy(z), z)).

When a specific example of the array X of the coordinates (z, x) before correction is (z, x), (0, 0), (40, 1), (80, 1), (120, 2), . . . as described above and a specific example of the array Y of the coordinates (z, y) before correction is (0, 0), (40, 1), (80, 3), (120, 4), . . . as described above, a specific example of the array X' of the coordinates (z, x') after correction is (0, 0), (40, 0.65), (80, 1.17), (120, 1.69), . . . , and a specific example of the array Y' of coordinates (z, y') after correction is (0, 0), (40, 0.00), (80, 0.96), (120, 1.93), . . . .

A specific example of the array O' after correction in which the coordinates of the arrays X' and Y' are returned to the three-dimensional coordinates (x', y', z) is (0, 0, 0), (0.65, 0.00, 40), (1.17, 0.96, 80), (1.69, 1.93, 120), . . . .

The array O' of the central axis data corrected in this way is data in which error and fluctuation occurring in the measurement illustrated in FIG. 1 and FIG. 2 are reduced.

Figure 10:
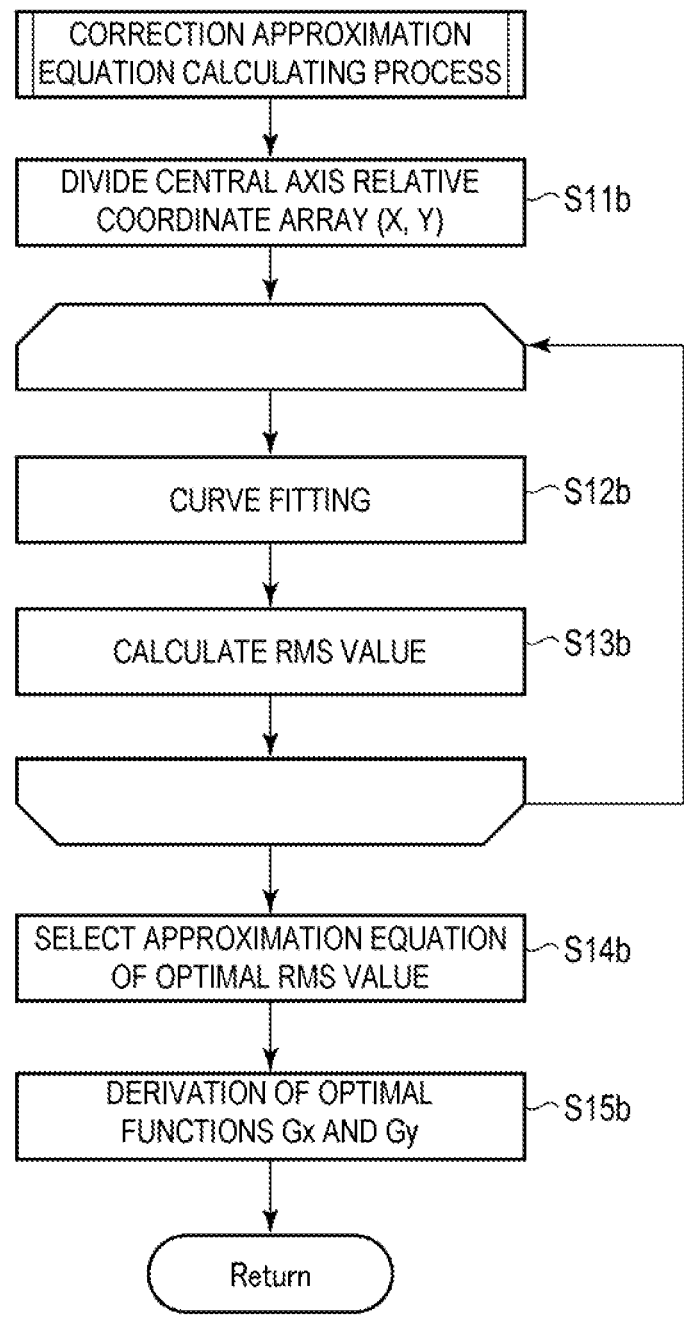
FIG. 10 is a diagram illustrating a modified example of a sequence and processing details of a correction approximation equation calculation processing.
Figures 11, 12:
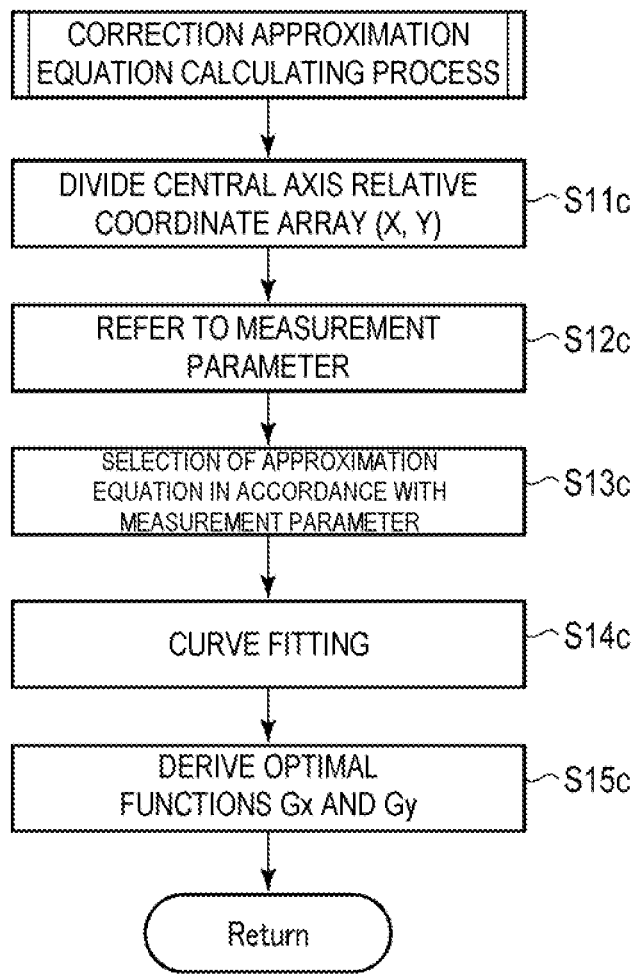
FIG. 11 is a diagram illustrating a modified example of a sequence and processing details of a correction approximation equation calculation processing.
FIG. 12 is a diagram illustrating one example of differences between central axis data before correction and central axis data after correction in a table form.

FIG. 10 and FIG. 11 are diagrams illustrating modified examples of a sequence and processing details of the correction approximation equation calculation processing. Hereinafter, a case in which arrays before correction are the arrays X and Y described above, and functions to be derived are optimal functions Gx and Gy (see FIG. 7) will be described. Note that, the correction approximation equation calculation processing can be applied also to a case in which an array before correction is the array D described above, and a function to be derived is an optimal function Gd as described above (see FIG. 8).

First, the processing illustrated in FIG. 10 will be described as a first modified example of the sequence and the processing details of the correction approximation equation calculation processing. This processing is acquired by adding processing of selecting an optimal type from among a plurality of types of correction approximation equations to the processing described with reference to FIG. 7.

In this process, first, similar to S11 described above, the correction approximation equation calculation processing unit 14a divides the array O of the central axis data of relative coordinates into an array X of the coordinates (z, x) and an array Y of the coordinates (z, y) (S11b).

Next, the correction approximation equation calculation processing unit 14a performs curve fitting, which is an application of a curve for each coordinate value of the array X and the array Y to a correction approximation equation according to each of a plurality of types, for each type (S12b). For example, the correction approximation equation is a quadratic polynomial, a cubic polynomial, a spline function, or the like.

Thereafter, the correction approximation equation calculation processing unit 14a acquires a difference between an array of coordinate values that is a target for selection of a type and a curve applied through the curve fitting for each type of correction approximation equation.

For example, the correction approximation equation calculation processing unit 14a calculates an RMS value for each type of correction approximation equation by substituting the difference amount described above at each point (k=1 to n) of the columnar model into $x'_k - x_k$ of the following Equation (3) at a coordinate $x'_k$ of the array X' after correction and a coordinate $x_k$ of the array X before correction.

[Formula 1]

$$\text{RMS} = \sqrt{\frac{1}{n}\sum_{k=1}^{n}(x'_k - x_k)^2}$$  EQUATION (1)

The correction approximation equation calculation processing unit 14a similarly acquires an RMS value for each type of correction approximation equation also for the array Y (S13b).

Since a correction approximation equation corresponding to a type with the smallest RMS value is an equation approximating data before correction with high accuracy, the correction approximation equation calculation processing unit 14a selects the type with the smallest RMS value as an optimal type of correction approximation equation (S14b). The selection of a type described here is a selection of a type of optimal correction approximation equation among, for example, the quadratic polynomial, the cubic polynomial, and the spline function described above. On the other hand, the selection of a type described above does not include calculation of the specific optimal functions Gx and Gy according to such a type.

Here, a selection criterion is not limited to the RMS value described above, and for example, a coefficient of determination (R-squared) or the like may be used.

Then, the correction approximation equation calculation processing unit 14a respectively derives the optimal function Gx of the x coordinate and the optimal function Gy of they coordinate in accordance with the results of the curve fitting described above according to the selected type (S15b).

Next, the processing illustrated in FIG. 11 will be described as a second modified example of the sequence and the processing details of the correction approximation equation calculation processing. This processing is acquired by adding processing of selecting an optimal correction approximation equation using parameters representing various measurement states according to an inspection vehicle MB at the time of acquiring point cloud data to the processing described with reference to FIG. 7.

In this process, first, similar to S11 described above, the correction approximation equation calculation processing unit 14a divides the array O of the central axis data of relative coordinates into an array X of (z, x) and an array Y of (z, y) (S11c).

Next, the correction approximation equation calculation processing unit 14a acquires data of various measurement devices of the inspection vehicle MB. For example, in a case in which point cloud data is measured by the MMS, the correction approximation equation calculation processing unit 14a calculates parameters such as a change in the posture angle, a vehicle speed, a distance to a columnar object, and the like of the inspection vehicle MB at the time of measurement based on the data.

Next, the correction approximation equation calculation processing unit 14a refers to the calculated parameters (S12c). The correction approximation equation calculation processing unit 14a selects an optimal type of correction approximation equation from among candidates for the correction approximation equation, for example, the quadratic polynomial, the cubic polynomial, and the spline function in accordance with a comparison between the value of each parameter and a threshold (S13c). The threshold of the magnitude of a parameter is a reference value relating to a selection of a function of the correction approximation equation and is a parameter that is determined through experiments.

For example, in a case in which there is a displacement of 70° or more as a parameter of a displacement amount of horizontal rotation of the inspection vehicle MB when point cloud data of one utility pole as an example of a ground object is measured, it is assumed that distortion of the data of the central axis is large. As a result, the correction approximation equation calculation processing unit 14a selects the quadratic polynomial of a lower degree as the correction approximation equation so that fitting is not performed more than necessary for the central axis data before correction.

In accordance with the selected type described above, the correction approximation equation calculation processing unit 14a performs curve fitting for acquiring each of a curve that best fits each coordinate value of the array X and a curve that best fits each coordinate value of the array Y (S14c).

Then, similar to S13 described above, the correction approximation equation calculation processing unit 14a separately derives, on the basis of the acquired curves, an optimal function Gx as a correction approximation equation for the x coordinate of the array X and an optimal function Gy as a correction approximation equation for the y coordinate of the array Y(S15c).

FIG. 12 is a diagram illustrating one example of differences between central axis data before correction and central axis data after correction in a table form.

FIG. 12 illustrates an example in which differences between a deflection value before correction and a deflection value after correction of central axis data measured under a condition in which a horizontal rotation angle of an inspection vehicle MB is equal to or larger than 70° for point cloud data of four utility poles at fields are compared among the quadratic polynomial, the cubic polynomial, and the spline function as candidates for a correction approximation equation.

In this example, it is disclosed that differences are minimum when the quadratic polynomial among various approximation equations is used, and accordingly, it is desirable to select the quadratic polynomial as an optimal correction approximation equation under such conditions.

In addition, such a parameter of the inspection vehicle MB is used for a selection of an approximation equation and can be also used as an index for the correction amount accuracy calculation processing unit 14d to estimate accuracy of central axis data. For example, in a case in which the same columnar object is measured at a short distance (several meters) and a long distance (several tens of meters) from the inspection vehicle MB, the accuracy of the central axis data can be estimated. For example, the accuracy of the central axis data tends to be high in a case in which the columnar object is measured at a short distance and the like.

As another example in which the accuracy of the central axis data tends to be high, there is a case in which a columnar object is measured by the correction amount accuracy calculation processing unit 14d in a state where a change in the vehicle speed or a change in the posture angle of the inspection vehicle MB is small.

Figure 13:
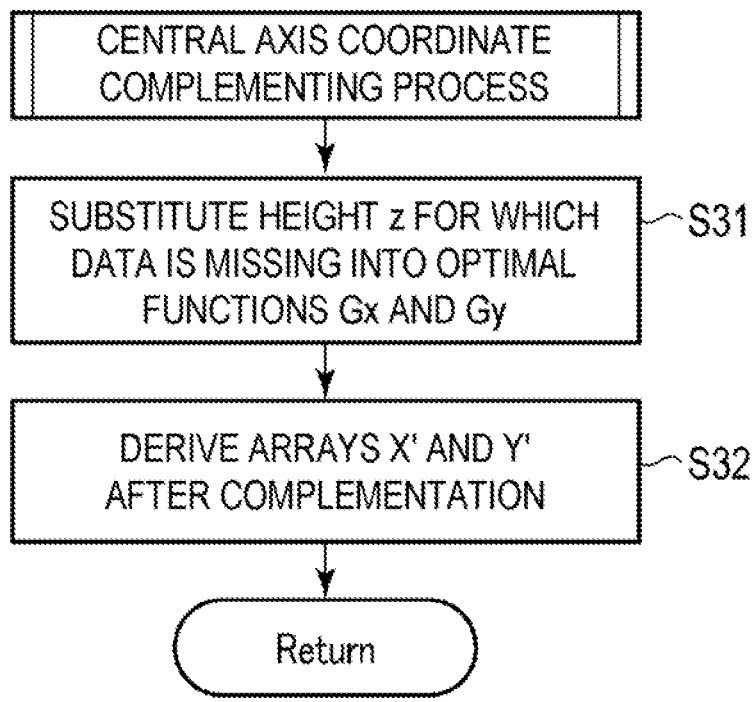
FIG. 13 is a flowchart illustrating one example of a sequence and processing details of a central axis coordinate complementing processing.

FIG. 13 is a flowchart illustrating one example of a sequence and processing details of a central axis coordinate complementing processing.

In the central axis coordinate correcting processing described above, the central axis coordinates correction processing unit 14b calculates coordinates after correction using a height coordinate z included in the array O.

In contrast to this, in the central axis coordinate complementing process, the central axis coordinates complementation processing unit 14c uses the optimal functions Gx and Gy acquired in the correction approximation equation calculation processing described above as complementation functions of the central axis coordinate, interpolates missing coordinate values among coordinate values for every predetermined height described above, and calculates the interpolated coordinate values as central axis data after complementation.

More specifically, for example, a case in which a specific example of the array X' of the coordinates (z, x') in the array O' after correction and before complementation is: (z, x'), (0, 0), (40, 0.65), (120, 1.69), . . . , and a specific example of the array Y' of the coordinates (z, y') after correction and before complementation is (0, 0), (40, 0.00), (120, 1.93), . . . will be assumed.

This case corresponds to a case in which each z coordinate value is one of equally-spaced heights of a columnar object, for example, one of heights of every 40 mm (0, 40, 80, 120. . . ), there are coordinate values (x coordinate value, y coordinate value) of center points for z coordinate values 0, 40, 120, . . . , and there are z coordinate values (z=80, . . . ) at which the coordinate values (x coordinate value, y coordinate value) of the center point are missing among the z coordinate values for heights of every 40 mm described above. In this case, the central axis coordinates complementation processing unit 14c substitutes each of the missing z coordinate values into the z value of the functions Gx and Gy acquired in the correction approximation equation calculation processing (S31). By such substitution, the central axis coordinates complementation processing unit 14c derives an x' coordinate of the array X' after complementation and a y' coordinate of the array Y' after complementation for the missing heights (S32).

A specific example of the array X' of the coordinates (z, x') in the array O' after complementation is (0, 0), (40, 0.65), (80, 1.17), (120, 1.69), . . . , and a specific example of the array Y' of the coordinates (z, y') after correction is (0, 0), (40, 0.00), (80, 0.96), (120, 1.93), . . . .

In other words, (80, 1.17) of the coordinates (z, x') and (80, 0.96) of the coordinates (z, y') are complemented.

In this way, by complementing x' and y' coordinates, the missing center points can be appropriately analogically inferred. The central axis coordinate correcting processing and the central axis coordinate complementing processing may be sequentially performed or may be simultaneously performed.

Figure 14:
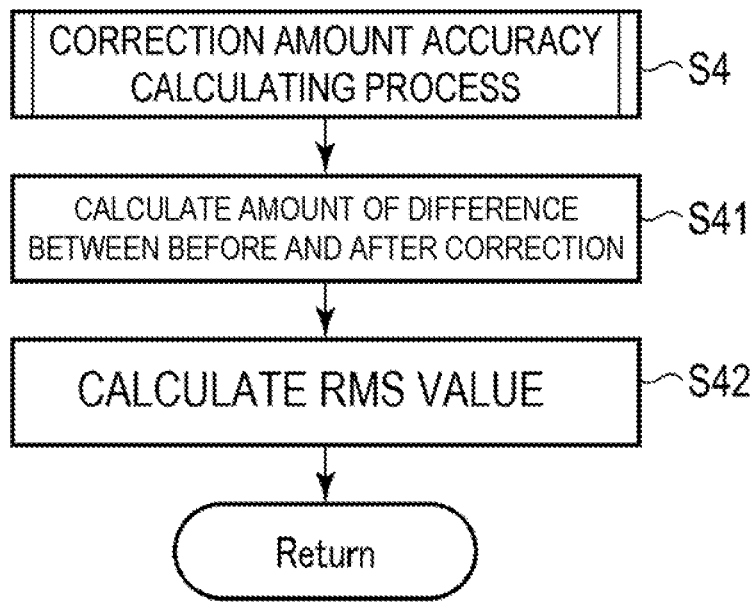
FIG. 14 is a flowchart illustrating one example of a sequence and processing details of a correction amount accuracy calculation processing.

FIG. 14 is a flowchart illustrating one example of a sequence and processing details of a correction amount accuracy calculation processing. The correction amount accuracy calculation processing unit 14d calculates an amount of difference between the coordinate values before correction and coordinate values after correction generated by the optimal functions Gx and Gy derived in the correction approximation equation calculation processing. For example, the correction amount accuracy calculation processing unit 14d acquires an amount of difference between an x coordinate value before correction at a certain height in the array X and an x' coordinate value at the same height in the array X' after correction for every height. The correction amount accuracy calculation processing unit 14d can similarly calculate an amount of difference between a y-coordinate value and a y' coordinate value also in the array Y (S41). This similarly applies also to a case in which the derived optimal function is Gd.

The correction amount accuracy calculation processing unit 14d calculates an RMS value by substituting the amount of difference when an x coordinate value before correction of each point (here, k=1 to n) is xk and an x' coordinate value after correction is x'$_k$ acquired in S41 into x'$_k$−x$_k$ of Equation (3) described above. The correction amount accuracy calculation processing unit 14d can similarly calculate an RMS value when a y coordinate value before correction of each point (here, k=1 to n) is y$_k$ and a y' coordinate value after correction is y'$_k$ also in the array Y (S42). This similarly applies also to a case in which the array is the array D.

Here, the amount of difference is not limited to the RMS value and, for example, may be a coefficient of determination (R-squared) or the like. A larger RMS value indicates a larger amount of correction. In other words, it can be understood that a fluctuation of the central axis data before correction at each height is large, and, consequently, the amount of correction is large.

Figure 15:
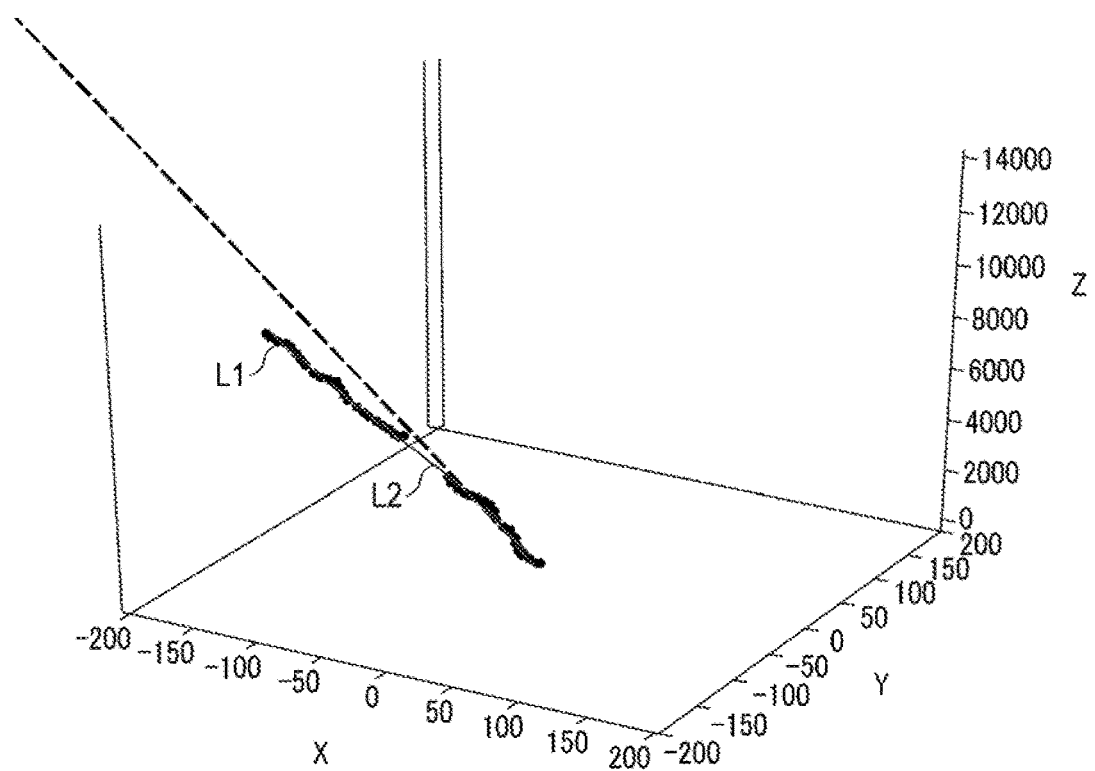
FIG. 15 is a diagram illustrating one example of the accuracy of correction according to a correction amount accuracy calculation processing.
Figure 16:
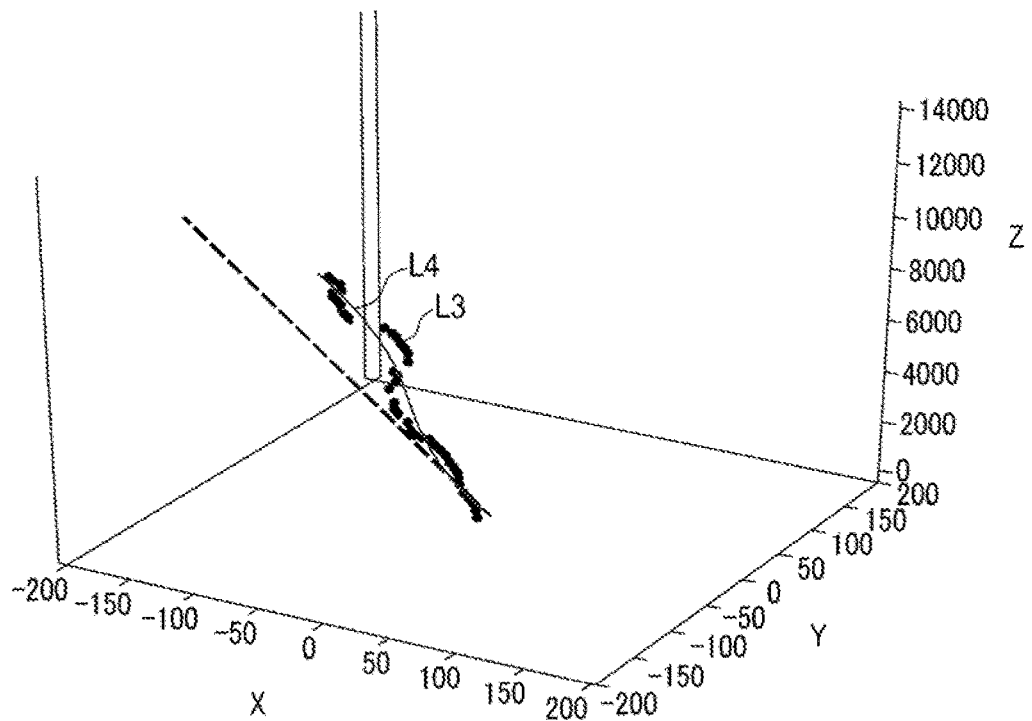
FIG. 16 is a diagram illustrating one example of the accuracy of correction according to a correction amount accuracy calculation processing.

FIG. 15 and FIG. 16 are diagrams illustrating examples of the accuracy of correction according to a correction amount accuracy calculation processing. In the example illustrated in FIG. 15, both RMS(X) that is an RMS value of x coordinates and RMS(Y) that is an RMS value for y coordinates are near 1.0, and a line L1 of a graph before correction and a line L2 of a graph after correction are not separated much from each other. In other words, both the accuracy of the measurement data and the accuracy of central axis data generated from the data are high.

On the other hand, in the example illustrated in FIG. 16, it is illustrated that RMS (X) is near 7, and a line L3 of a graph before correction and a line L4 of a graph after correction deviate significantly from each other. As illustrated in FIG. 16, data before correction is data in which a large error occurs at the time of measurement, and the RMS value is sufficiently usable as an index for analogically inferring the accuracy of the central axis data.

Figure 17:
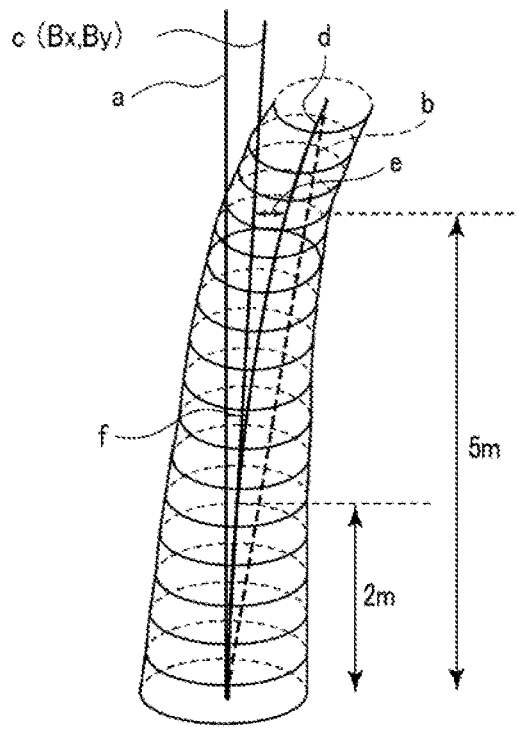
FIG. 17 is a diagram illustrating various definitions in an inclination/deflection calculation processing.

Next, an inclination/deflection calculation processing will be described. FIG. 17 is a diagram illustrating various definitions in the inclination/deflection calculation processing.

For the description of the inclination/deflection calculating process, as illustrated in FIG. 17, a vertical axis (a in FIG. 17), an inclining axis (b in FIG. 17), a reference axis (c in FIG. 17), a central axis (d in FIG. 17), and a deflection (e in FIG. 17), and an inclination (f in FIG. 17) of a columnar object are defined as below.

Figure 18:
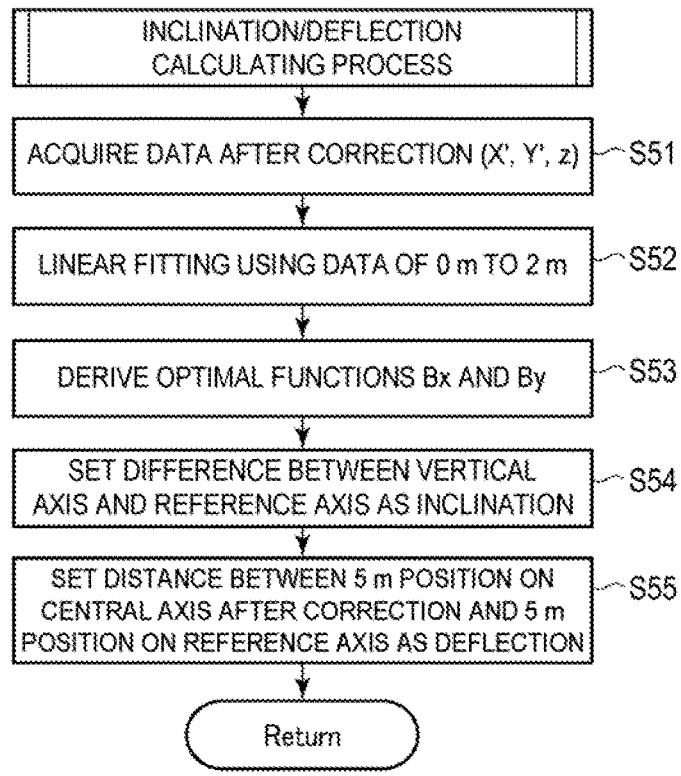
FIG. 18 is a flowchart illustrating one example of a sequence and processing details of an inclination/deflection calculation processing.

Vertical axis: perpendicular line (vertical line)
Inclining axis: straight line joining central axis coordinates of the cross-sectional circle disposed at a highest position in the columnar object and the central axis coordinates of the ground surface (bottom face)
Reference axis: extension of a straight line passing near a center point of the columnar object in the horizontal direction from the ground surface (the bottom face of the columnar object) to a height of 2 m
Central axis: Axis joining the center of each circle (for height of every 4 cm)
Deflection: distance between a reference axis and a central axis at a height of 5 meters from ground surface
Inclination: angle between the vertical axis and the reference axis FIG. 18 is a flowchart illustrating one example of a sequence and processing details of the inclination/deflection calculation processing.

The inclination/deflection calculation processing is processing in which an inclination component and a deflection component are respectively calculated from a columnar object having an inclination and a deflection by the inclination/deflection amount calculation processing unit 14e. Here, although a case in which arrays before correction are the arrays X and Y described above, and functions to be derived are optimal functions Gx and Gy will be described, the processing can be also applied to a case in which an array before correction is the array D described above, and a function to be derived is the optimal function Gd as described above.

More specifically, the inclination/deflection amount calculation processing unit 14e acquires data of central axis coordinates having coordinates (x', y', z) after correction (S51).

Then, the inclination/deflection amount calculation processing unit 14e performs linear fitting, which is linear fitting using a linear function for the arrays X and Y, for example, using the central axis data of a height of 0 mm from the ground surface to a height of 2000 mm in the acquired data (S52).

On the basis of this straight line, the inclination/deflection amount calculation processing unit 14e acquires linear polynomials (for example, x=ax+b, y=cx+d) as optimal functions Bx and By through a least squares method or the like (S54).

The inclination/deflection amount calculation processing unit 14e defines a straight line of these optimal functions Bx and By as a reference axis of the columnar model represented by the data acquired in S51. In addition, the inclination/deflection amount calculation processing unit 14e defines an angle between the reference axis and the vertical axis as an inclination of the central axis of the columnar model represented by the data acquired at S51 (S54).

Next, the inclination/deflection amount calculation processing unit 14e calculates a distance between the coordinates (x', y', z) of the center point at a point having a height 5000 mm from the ground surface, which is represented by the center point data after correction and a position corresponding to a height 5000 mm on the reference axis (the straight line of the optimal functions Bx and By) acquired in S54. The inclination/deflection amount calculation processing unit 14e defines this distance as a deflection of the central axis of the columnar model appearing in the data acquired in S51 (S55). In this inclination/deflection calculating process, not the original data before correction but the data after correction is used, and accordingly, inclination and deflection with higher accuracy can be calculated.

Figure 19:
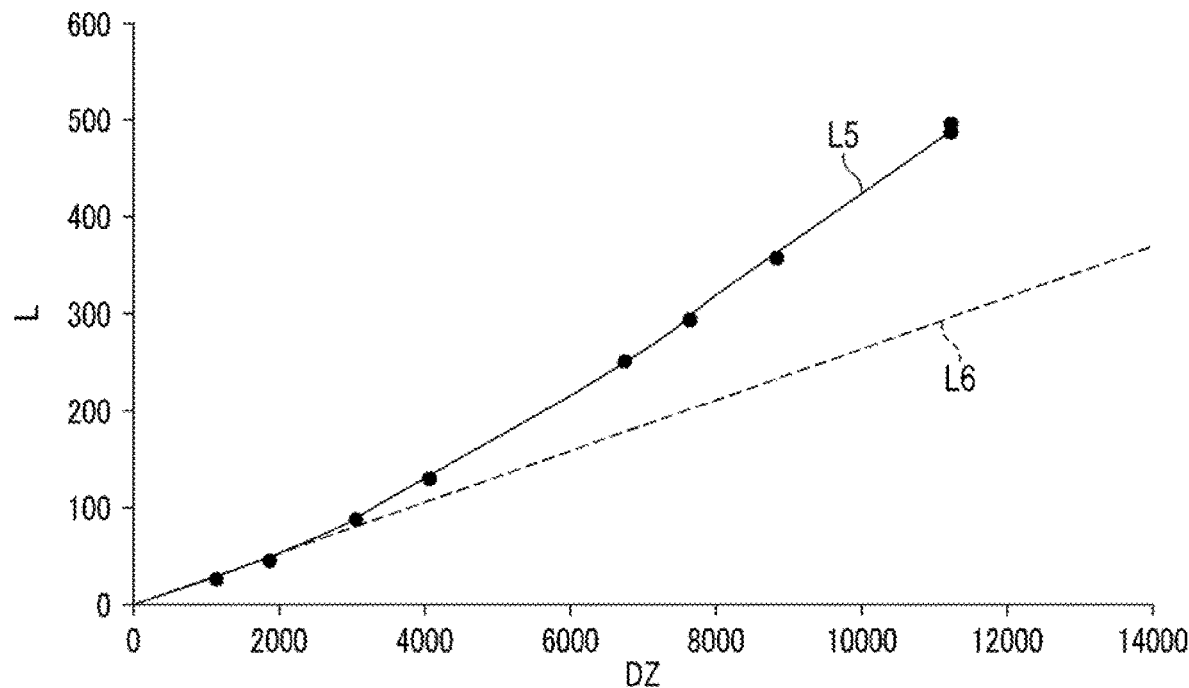
FIG. 19 is a diagram illustrating one example of calculation results according to an inclination/deflection calculation processing.

FIG. 19 is a diagram illustrating one example of calculation results according to the inclination/deflection calculation processing.

In addition, although the number of pieces of central axis data is small in a case in which the surveying instrument 21 as illustrated in FIG. 2 is used, by performing a central axis coordinate complementing processing as illustrated in FIG. 19, for example, an inclination up to 2 m from the ground surface and a deflection value at a point 5 m from the ground surface can be calculated with high accuracy. Thus, in the central axis coordinate complementing process, an inclination and a deflection can be calculated with increased accuracy from the central axis data according to the surveying instrument 21.

L5 (a solid line) illustrated in FIG. 19 is central axis data after correction extracted using the optimal function Gd. L6 (a dotted line) illustrated in FIG. 19 is a reference axis, for example, a reference axis drawn with the optimal function Gd.

A vertical axis L illustrated in FIG. 19 and subsequent drawings is a distance on a plane between a straight light extending vertically from a center position of the bottom face and the central axis at the same height.

A horizontal axis DZ illustrated in FIG. 19 and subsequent drawings is a height z when the bottom face is set to a height of 0.

Figure 20:
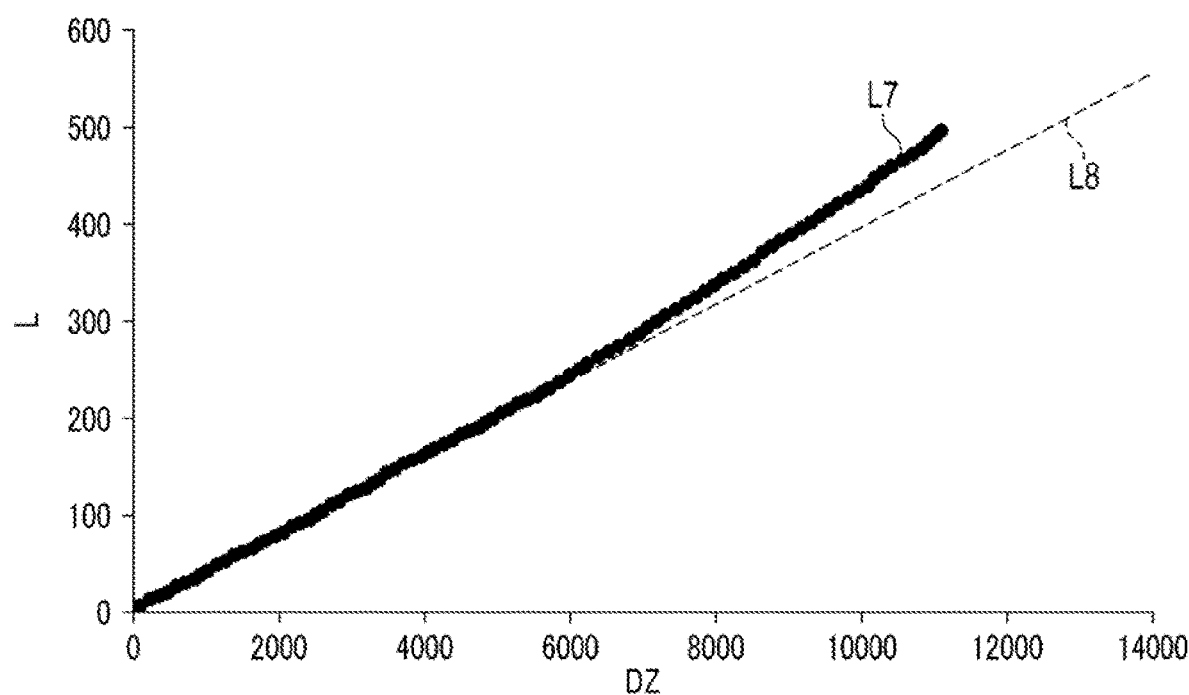
FIG. 20 is a diagram illustrating one example of display results according to a display unit.
Figure 21:
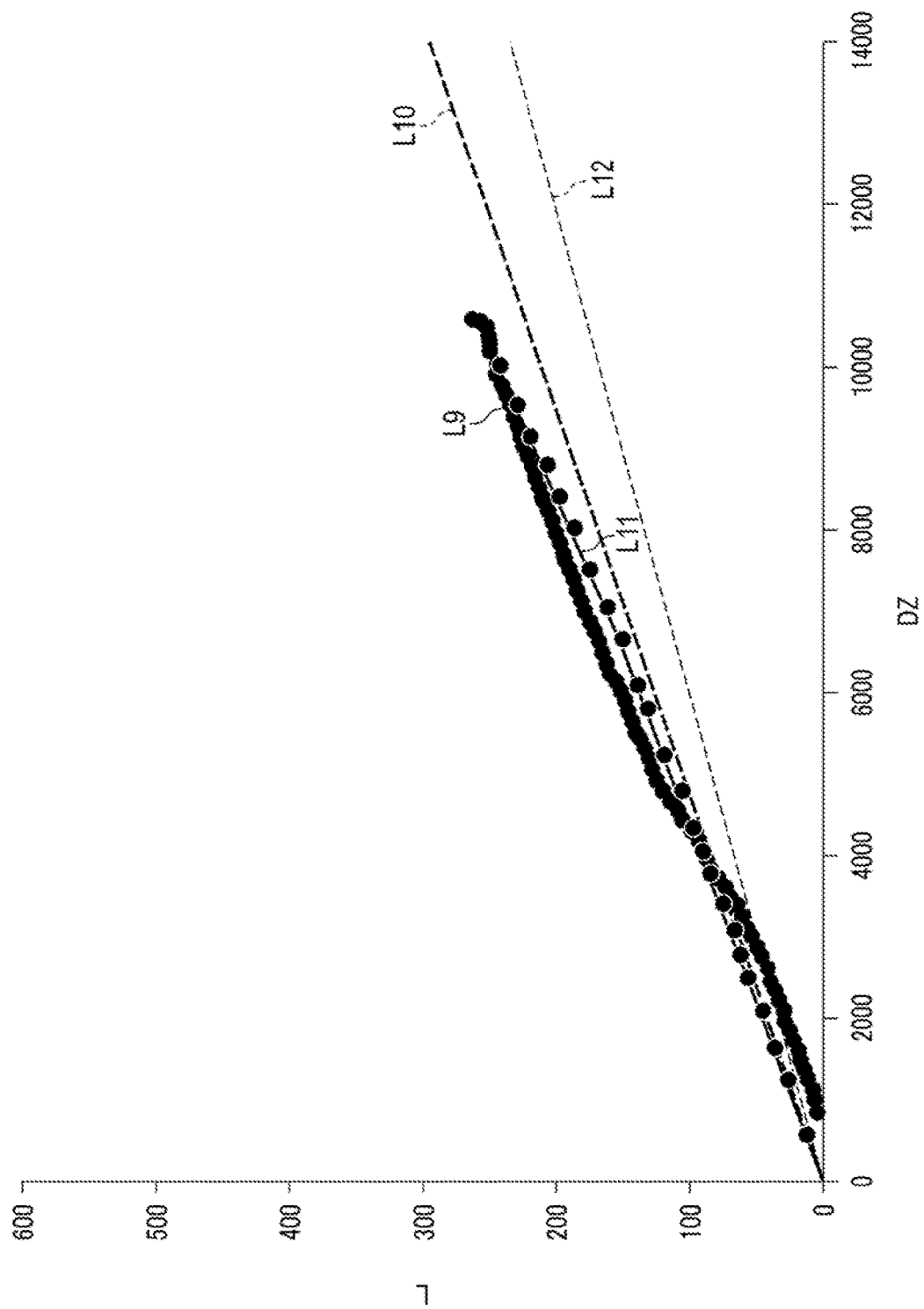
FIG. 21 is a diagram illustrating one example of display results according to a display unit.

FIG. 20 and FIG. 21 are diagrams illustrating examples of display results according to a display unit.

The display unit 16 includes a functional unit that displays various results acquired by the arithmetic operation unit 14 as graphs as illustrated in FIG. 20. L7 (set of black dots) illustrated in FIG. 20 is a plot of central axis data that has been measured, and L8 (dotted line) illustrated in FIG. 20 is a reference axis.

The display unit 16, for example, also can display various results as below in a text form.

Identification name of columnar object (for example, double middle support R2R5-1)

Optimal function Gd (for example, Gd: y=0.055z^3−0.176z^2+39.699z+1.132)

Number of cross sections (the number of elements of the array) (Example: 278)

Height (difference between a maximum value and minimum value of z) (for example, 11109)

Number of cross sections*interval of cross sections (for example, 40 mm)/height*100 (the number of points that can be measured per height) (for example, 100.1%)

Column height (height of columnar object) (for example, 14.0)

Number of cross sections*interval of cross sections (for example, 40 mm)/(column length*(5/6)*0.85) (a degree of accuracy of measurement of the shape of an actual columnar object) (for example, 100.0%)

RMS Value (for example, 1.3)

Inclination (for example, 2.6°)

Deflection (2D) (a deflection value acquired using the optimal function Gd) (for example, 0.3)

Deflection (3D) (a deflection value acquired using the optimal functions Gx and Gy) (for example, 0.7)

R2 (coefficient of determination acquired using the optimal function Gd) (for example, 1.00)

RMS(X) (for example, 1.1)

RMS(Y) (for example, 1.3)

M inclination (inclination in a case in which correction is not performed using the correction approximation equation) (for example, 2.6°)

M deflection (3D) (deflection in a case in which no correction is made) (for example, 1.2)

Maximum amount of displacement (maximum value of a difference (an amount of displacement) between the i-th z-coordinate and the (i+1)-th z-coordinate) (for example, 6.1)

Displacement amount standard deviation (standard deviation of maximum displacement amount) (for example, 1.2)

Estimation of ground surface (height of a road surface near a columnar object that is a measurement target) (for example, 17046)

Lowest point (a center point of the bottom face of the measurement target (a minimum value of z)) (for example, 17075.0)

Vehicle distance (a distance from the inspection vehicle MB to a columnar object) (for example, 3.3)

GPS time (time at the time of measurement) (for example, 104801.5)

The data displayed on the display unit 16 is stored in DB 15 and is read from the DB 15 and displayed on the display unit 16. In accordance with this display, an operator visually recognizes various kinds of information in a unified manner and can easily check points, at which central axis data is missing, that are points that cannot be easily determined using only numerical values. In addition, an image of deviations of data before correction can be easily perceived, and various kinds of data can be compared with each other.

L9 (a set of black circles) illustrated in FIG. 21 is a plot of values of central axis data after correction based on the data measured in the configuration illustrated in FIG. 1. L10 (a dotted line) illustrated in FIG. 21 is a reference axis acquired in the configuration illustrated in FIG. 1.

In addition, L11 (a solid line) illustrated in FIG. 21 is a plot of values of central axis data after correction based on the data measured in the configuration illustrated in FIG. 2. L12 (a dotted line) illustrated in FIG. 21 is a reference axis acquired in the configuration illustrated in FIG. 2. In this way, the central axis data can be compared with that of other measurement devices.

In addition, the display unit 16 is not limited to display the measurement results according to other measurement devices and can also display results of measurement performed a plurality of number of times according to the same measurement device. In accordance with this, not only a correction processing for single measurement data but also comparison between errors of devices and measurements can be performed, and accordingly, results thereof can be also used for evaluation of a measurement method.

As described above, in an embodiment of the present invention, the central axis of a columnar object is corrected using a correction approximation equation. As a result, the coordinate positions of the central axis of the columnar object are automatically corrected.

In addition, in an embodiment of the present invention, when a part of the central axis data of a columnar object is missing due to influences of blocking objects and the like, processing of complementing the missing part is further performed using a correction approximation equation acquired using the central axis data that is not missing. In accordance with this, a missing part of the central axis data is automatically complemented.

In an embodiment of the invention, by comparing the central axis data after correction with the central axis data before correction, improvement/deterioration of the accuracy of correction is calculated. In accordance with this, without requiring additional field checking and the like, the degree of accuracy of the corrected central axis data can be determined.

In addition, the present invention is not limited to the embodiments described above, and various modifications can be made in a range not departing from the concept in a practical application step. Furthermore, the embodiments may be performed in combination as is appropriate if possible, and combined effects can be acquired in such a case. In addition, inventions of various steps are included in the embodiment described above, and thus, various inventions may be extracted by appropriately combining a plurality of constituent elements that have been disclosed.

In addition, the technique described in each embodiment can be stored on a recording medium, for example, a magnetic disk (a floppy (registered trademark) disk, a hard disk, or the like), an optical disc (a CD ROM, a DVD, an MO, or the like), a semiconductor memory (a ROM, a RAM, a flash memory, or the like), or the like as a program (a software means) that can be executed by a computing device (a computer) and can be transmitted and distributed through a communication medium. In addition, in a program stored on the media side, a setting program that configures a software means (including not only an execution program but also a table or a data structure) executed by the computing device inside the computing device is also included. The computing device realizing the present device executes the processes described above by reading a program recorded on a recording medium, building a software means in accordance with the setting program depending on the situations, and having the operation controlled by this software means. In addition, a recording medium described in this specification is not limited to that used for distribution but includes a storage medium such as a magnetic disk, a semiconductor memory, or the like provided inside the computing device or in a device connected through a network.

REFERENCE SIGNS LIST

1 Three-dimensional laser scanner;
2 Camera
3 GPS receiver
5 Odometer
7 Closure
8 Cable
9 Pole
10 Tree
10a Traffic lamp
10b, 10c Traffic sign
11 Storage medium
12 Arithmetic operation device
13 Extraction processing unit
13a 3D model extracting unit
13b Acquisition unit
14 Arithmetic operation unit
14a Correction approximation equation calculation processing unit
14b Central axis coordinate correction processing unit
14c Central axis coordinate complementation processing unit
14d Correction amount accuracy calculation processing unit
14e Inclination/deflection amount calculation processing unit
15 DB
16 Display unit
21 Surveying instrument
22 Image processing device

The invention claimed is:

1. A columnar object state detection device that is a device for detecting a state of a columnar object, the device comprising:
    a processor; and
    a storage medium having computer program instructions stored thereon, when executed by the processor, perform to:
    acquire central axis data that is an array of coordinate values of center points of the columnar object in a horizontal direction at a plurality of predetermined heights of the columnar object;
    calculate a correction approximation equation for correcting the coordinate values of the central axis data through curve fitting for the array of the coordinate values of the central axis data; and
    correct the coordinate values of the central axis data acquired using the correction approximation equation.

2. The columnar object state detection device according to claim 1, wherein the computer program instructions further perform extract three-dimensional model data acquired by three-dimensionally modeling the columnar object from three-dimensional point cloud data representing three-dimensional coordinates of points on a surface of the columnar object, acquires the central axis data that is the array of the coordinate values of the center points of the columnar object in the horizontal direction at the plurality of predetermined heights of the columnar object on the basis of the three-dimensional model data.

3. The columnar object state detection device according to claim 1, wherein the computer program instructions further perform to selects an appropriate type of the correction approximation equation on the basis of a difference between the array of the coordinate values of the central axis data and a result of the curve fitting based on each of functions of a plurality of types for the array and calculates the correction approximation equation through the curve fitting according to the selected type.

4. The columnar object state detection device according to claim 2, wherein the computer program instructions further perform to selects an appropriate type of the correction approximation equation on the basis of a parameter representing a measurement state of the three-dimensional point cloud data and calculates the correction approximation equation through the curve fitting according to the selected type.

5. The columnar object state detection device according to claim 1, wherein the coordinate values of the central axis data are coordinate values in which coordinate values of a center point at a predetermined height of the columnar object are missing, wherein the computer program instructions further perform to complement the missing coordinate values among the coordinate values of the central axis data corrected on the basis of the correction approximation equation.

6. The columnar object state detection device according to claim 1, wherein the computer program instructions further perform to calculate an accuracy of correction of the central axis data on the basis of differences between the coordinate values of the central axis data and coordinate values after correction of the coordinate values.

7. The columnar object state detection device according to claim 1, wherein the computer program instructions further perform to set a vertical axis and a reference axis that is a straight line passing near a center point at a height up to a predetermined first height of the columnar object for three-dimensional model data of the columnar object, calculates an angle between the vertical axis and the reference axis as an inclination of the central axis of the columnar object, and calculates a distance between coordinates of a center point corresponding to a predetermined second height of the columnar object represented by the central axis data and a position at the second height on the reference axis as a deflection of the central axis of the three-dimensional model data of the columnar object.

8. A columnar object state detection method performed by a columnar object state detection device for detecting a state of a columnar object, the columnar object state detection method comprising: acquiring central axis data that is an array of coordinate values of center points of the columnar object in a horizontal direction at a plurality of predetermined heights of the columnar object; calculating a correction approximation equation for correcting the coordinate values of the acquired central axis data through curve fitting for the array of the coordinate values of the acquired central axis data; and correcting the coordinate values of the acquired central axis data using the calculated correction approximation equation.

9. A non-transitory computer readable medium including instructions executable by one or more processors to acquiring central axis data that is an array of coordinate values of center points of the columnar object in a horizontal direction at a plurality of predetermined heights of the columnar object;

calculating a correction approximation equation for correcting the coordinate values of the acquired central axis data through curve fitting for the array of the coordinate values of the acquired central axis data; and correcting the coordinate values of the acquired central axis data using the calculated correction approximation equation.

* * * * *